United States Patent [19]
Gillet

[11] Patent Number: 5,274,820
[45] Date of Patent: Dec. 28, 1993

[54] METHOD AND SYSTEM FOR ELIMINATING OPERATION CODES FROM INTERMEDIATE PROLOG INSTRUCTIONS

[75] Inventor: Marc J. L. Gillet, Redwood City, Calif.

[73] Assignee: International Business Machines Corporation, Armonk, N.Y.

[21] Appl. No.: 932,906

[22] Filed: Aug. 19, 1992

Related U.S. Application Data

[63] Continuation of Ser. No. 393,630, Aug. 14, 1989, abandoned.

[51] Int. Cl.⁵ .............................................. G06F 9/44
[52] U.S. Cl. .............................. 395/700; 364/DIG. 1;
364/280; 364/280.4; 364/262.4; 364/260.4
[58] Field of Search ................ 395/700, 650, 375

[56] References Cited
U.S. PATENT DOCUMENTS

| | | | |
|---|---|---|---|
| 3,754,218 | 8/1973 | Hatta et al. | 340/172.5 |
| 4,241,397 | 12/1980 | Stecker et al. | 364/200 |
| 4,435,753 | 3/1984 | Rizzi | 364/200 |
| 4,546,432 | 10/1985 | Umemura et al. | 364/200 |
| 4,571,678 | 2/1986 | Chaitin | 364/200 |
| 4,782,444 | 11/1988 | Munshi et al. | 364/200 |
| 4,953,084 | 8/1990 | Meloy et al. | 364/200 |
| 4,961,141 | 10/1990 | Hopkins et al. | 364/200 |

OTHER PUBLICATIONS

David H. D. Warren, "Implementing Prolog", *DAI Research Report No. 39*, vol. I, May 1977.
Gabriel et al., "A Tutorial on the Warren Abstract Machine For Computational Logic", *Argonne National Library*, Jun. 1985.
Bendelec et al., 1988 IEEE International Conference on Computer Design: VLSI In Computers & Processors, Oct. 3-5, 1988, pp. 247-250.
Wada et al., "Intermediate Code For the Sequential Prolog Machine PEK", Microprocessing & Microprogramming vol. 21, Nos. 1 α 5, Aug. 1987 pp. 275-282.

*Primary Examiner*—Kevin A. Kriess
*Attorney, Agent, or Firm*—L. Keith Stephens; G. Marlin Knight

[57] ABSTRACT

An improved architecture for a Prolog interpreter is described. Implicit arguments are substituted for classical explicit arguments. The implicit arguments are supported by preassigned register allocation managed by the interpreter. The interpreter also exploits improved Prolog Object processing in which the first bit of the Prolog object word is used as a flag to indicate whether the object word is a type pointer or type descriptor. Significant improvements in interpreter execution result from the usage of these techniques.

12 Claims, 27 Drawing Sheets

Instead of representing a Prolog object by records of the form:

and a word of type descriptor is:

| Data_Type | 370/XA Assembler | C | Cobol | Fortran | PL/1 |
|---|---|---|---|---|---|
| B1 | Byte | unsigned char | | | BIT(8) |
| B2 | Half word | unsigned short | | | BIT(16) |
| B4 | Word | unsigned long | | | BIT(32) |
| 1 | Byte | signed char | | | |
| 2 | Half word | signed short | PIC S9(4) BINARY | INTEGER*2 | BIN FIXED(15) |
| 4 | Word | signed long | PIC S9(9) BINARY | INTEGER*4 | BIN FIXED(31) |
| E4 | Short floating point | float | COMP-1 | REAL*4 | DEC FLOAT(6) |
| E8 | Long floating point | double | COMP-2 | REAL*8 | BEC FLOAT(15) |
| 4 | Pair of short floating point | | | COMPLEX*8 | COMPLEX DEC FLOAT(6) |
| 8 | Pair of long floating point | | | COMPLEX*16 | COMPLEX DEC FLOAT(15) |
| C1 | Character | char | PIC X DISPLAY | CHARACTER*1 | CHAR |
| Cn | n Characters | char[n] | PIC X(n) DISPLAY | CHARACTER*n | CHAR(n) |
| C0 | | char[]¹ | | CHARACTER*(*) | |
| C4 | | ¹"unconverted IBM Prolog 370 object" | | | |

FIG. 16

```
                        ┌─────────────────── C Example ───────────────────┐
typedef Result struct { unsigned short Nb; char Ce [8]; }
typedef Datain struct { double Db; struct { char Ch; float Ft; } St; }
Result * my_func(unsigned char Uc, signed long Sl, Datain Dv, Datain * Dp, char * Cp, float
       Fa [10], signed short Ip                950 ─╯        955 ─╯   957 ─╯   959 ─╯   965 ─╯
            ╰─963    965 ─╯
```

FIG. 17

| LABEL | PROARGS | <(B2,A),(C8,A),>, | | Comment: | Describes Result * |
|---|---|---|---|---|---|
| | | (B1,I), | | | Describes Uc * |
| | | (I4,I), | | (Sequence = 4) | Describes Sl * |
| | | <(E8,V),<(C1,V),(E4,V),>,>, | | | Describes Dv * |
| | | <(E8,10),<(C1,10),(E4,10),>,>, | | | Describes Dp * |
| | | (C0,I), | | | Describes Cp * |
| | | (E4,0,10), | | | Describes Fa * |
| | | (I2,10,ARG4) | | (Refer to Sl) | Describes Ip |

FIG. 18

| | | | |
|---|---|---|---|
| FORCTARG | DSECT | | |
| FORCFLAG | DS | 1X | Flag byte |
| FORFDIM | EQU | X'80',1 | This argument is dimension of an array |
| FORFDEF | EQU | X'40',1 | This argument is dimension of an IN array |
| FORFINP | EQU | X'20',1 | This argument in IN or IN part of an IO |
| FORFYES | EQU | X'10',1 | the FORCDIMC field contains a dimension |
| FORFIOP | EQU | X'08',1 | This argument is IO |
| FORFREG | EQU | X'04',1 | This argument is Register (R or A) |
| FORFVAL | EQU | X'02',1 | This argument is by value (V or R) |
| FORFPAD | EQU | X'01',1 | This descriptor is a < or > |
| FORCTYPE | DS | 1X | Type / Size type |
| FORTMSK | EQU | X'E0',1 | Type Mask in the FORCTYPE byte |
| FORLMSK | EQU | X'1F',1 | Size Mask in the FORCTYPE byte |
| FORTINT | EQU | X'00',1 | This argument type is signed integer |
| FORTBIN | EQU | X'20',1 | This argument type is unsigned integer |
| FORTFLT | EQU | X'40',1 | This argument type is real float |
| FORTCMP | EQU | X'60',1 | This argument type is complex float |
| FORTCHR | EQU | X'81',1 | This argument type is character-1 |
| FORTPRL | EQU | X'A4',1 | This argument type is prolong object-4 |
| FORTARE | EQU | X'C1',1 | This argument type is choice area-1 |
| FORCDEPT | DS | 1X | Nesting Byte |
| FORDBEG | EQU | X'80',1 | This descriptor opens a parameter |
| FORDEND | EQU | X'40',1 | This descriptor closes a paramenter |
| FORDDUP | EQU | X'20',1 | This descriptor is a <, up 1 level |
| FORDDDN | EQU | X'10',1 | This descriptor is a >, down 1 level |
| FORDAL8 | EQU | X'08',1 | this < or > descriptor needs 8 alignment |
| FORDAL4 | EQU | X'04',1 | this < or > descriptor needs 4 alignment |
| FORDAL2 | EQU | X'02',1 | This < or > descriptor needs 2 alignment |
| FORCFREE | DS | 1X | Offset 1st free byte in this descriptor |
| FORCSADD | DS | 1A | Converted argument storage start address |
| FORCEADD | DS | 0A | Converted argument storage end address |
| FORCDSKE | DS | 1A | Arity of the current nesting level,< or > |
| FORCDIMC | DS | 1A | Multiplicity (1 default, 2 in J, n if Cn) |
| * | | | or Actual dimension if referred descriptor |
| FORCDIM1 | DS | 0A | Pointers to Referred Dimension Descriptors |
| * | | | or opposite of the Fixed Dimension |

FIG. 19

```
C ----- The Fortran main program must be kept as follows

PROGRAM      Z1MAIN
        CALL         Z1COMH
        STOP
```

FIG. 20

```
        INTEGER FUNCTION STUPID(TSI)
        INTEGER        TSI
        REAL           TSR
10      IF (TSI .EQ. 0)    GOTO 10
        TSR = 1. / FLOAT(TSI-1)
        STUPID = TSI -1
        RETURN
        END
```

FIG. 21

```
PRODECE    STUPID,NAME=STUPIDE,ARGS=AGINT,FORM=FUNC
    .
    .
AGINT      PROARGS    (I4,R),(I4,I)
    .
    .
    .
```

FIG. 22

```
<- ext_func(my_stupide(*),myfort,stupide).
goal : <- ext_func(my_stupide(V1),myfort,stupide).
Oms sucess
<- ext_func(my_stupide(V1),myfort,stupide).

<-* := my_stupide(2).
goal : <- V1 := my_stupide(2).
130ms sucess
<- 1 := my_stupide(2).

<-* := my_stupide(3).
goal : <- V1 := my_stupide(3).
3ms sucess
<- 2 := my_stupide(3).

<-* := my_stupide(1).
goal : <- V1 := my_stupide(1)

AFB2091 VFNTH : PROGRAM INTERRUPT - FLOATING-POINT DIVIDE EXCE

VFNTH : PSW FFE4000F82482652,
    REGISTER CONTAINS 4110000000000000000000000000000000
    VFNTH : LAST EXECUTED FORTRAN STATEMENT IN PROGRAM STU
    AT ISN 5 (OFFSET 000212).

TRACEBACK OF CALLING ROUTINES; MODULE ENTRY ADDRESS = 482108.

STUPID (428440) CALLED BY Z1MAIN (482108) AT OFFSET 376950.
     ARGUMENT LIST AT 5FD0AC.
     ARG. NO.   ADDRESS.   INTEGER    REAL       CHAR      HE
          1    80534008 :       1    0.000001E-78  '....'     0

Z1MAIN (482108) CALLED BY OPERATION SYSTEM.

STANDARD CORRECTIVE ACTION TAKEN. EXECUTUION CONTINUING.
    3ms sucess
    <- 0 := my_stupide(1).
```

FIG. 23

<- ext_pred(testtabl(*,*,*),myfort,testtable) .
goal : <- ext_pred(testtabl(V1,V2,V3),myfort,testtabl) .
0ms success
<- ext_pred(testtabl(V1,V2<v3),myfort,testtabl) .

goal : <- testtabl([100,101,102,103],[[200,201][300,301]
['Chaine1','Chaine2'])

```
Entier  long     (      4) =        100
Flottant court   (    2      3) =    200.00000000
Chaine           (      2) = 'Chaine1'
Common Blanc  =   1017
Common Nomme =   -1017
Common Blanc  =   1017
Common Nomme =   -1017
Common Blanc  =   2017
Common Nomme =   -2017
Common Blanc  =   3017
Common Nomme =   -3017
Common Blanc  =   4017
Common Nomme =   -4017

Common Blanc  =   5017
Common Nomme =   -5017
Common Blanc  =   6017
Common Nomme =   -6017
Common Blanc  =   7017
Common Nomme =   -7017
Common Blanc  =   8017
Common Nomme =   -8017
Common Blanc  =   9017
Common Nomme =   -9017
Common Blanc  =   10017
Common Nomme =   -10017
       9ms success
```
<- testtabl([100,101,102,103],[[200,201][300,301]
['Chaine1','Chaine2']) .

FIG. 24

```
PRODECE  Z1FORTO,NAME=PGENERIC,BINFO=1,FORM=PRED
PRODECE  Z1FORTO,NAME=FGENERIC,BINFO=1,FORM=FUNC
```

FIG. 25

```
<- * := exponent(exponent([0 + 0,0 + 0])) .
goal : <- V1 := exponent(exponent([0 + 0,0 + 0])) .
0ms success
<- [2.7182817459,0.] := exponent(exponent([0 + 0,0 + 0])) .
```

FIG. 26

```
typedef struct *int i; struct * char c; * b; float f;* record;
#include <stdlib.h>
#include <studio.h>
#include <math.h>
#include <bayou.h>
float  vf    ;
int main()
  *
    Prolog_Init;
    return(0);
  *
char prol(tsa,tpi)
    int *      tsa;
    Prolog_Object * tpi;
  *
    Prolog_Object  tsi   = * tpi;
    Prolog_Object  ts1   = tsi;
    Prolog_Object  t1st2 = Prolog_Constant(Prolog_CST_LIST );
    char *     tsc;
      if (Prolog_Type(tsi) = Prolog_TYPE_ATOM
        *tpi = Prolog_Convert_Prolog(
        Prolog_TYP_ATOM,tsi,Prolog_TYPE_STRING); *
      switch(Prolog_Type(tsi)) *
        case(Prolog_TYP_ATOM):
        case(Prolog_TYPE_NIL):
          is ((ts1 = Prolog_Convert_Prolog(0,tsi,Prolog_TYPE_STRING)) =
             NULL) break;
        case(Prolog_TYP_STRING) :
          if((tsc = Prolog_Convert_String(ts1)) = NULL) break;
          is(((*tsa)+=1) >= strlen(tsc))
            *Prolog_Reset_Choice();* else *Prolog_Set_Choice();*;
          if(( * tsa    ) <= strlen(tsc))
          *return(tsc[*tsa-1]);* else * return(' ');*;
        default: return(' ');*

*
float * expon(val)
    float   *val;
  *
    vf = exp(*val);                         return(& vf);
  *
```

FIG. 27

```
/*-----  Declarations of Constants and Functions for BAYOU => C include <BAYOU.H>
/*-----  Declarations of Constants and Functions for BAYOU => C
```

FIG. 28

```
int main(ac, av)
    int   ac;
    char *av[];
{
    ...
    Prolog_Init;
    ...
    return(0);
}
```

FIG. 29

```
EXEC DLIB LOAD
CPLINK myc0 Z1COMP1 Z1COMP2 myc1 (NOMAP
EXEC DLIB UNLOAD
RENAME CPOBJ TEXT A myc TEXT A
```

FIG. 30

```
int stupid(tsi)
   int *tsi;
   {
      float tsr;
      for(;;) { if (*tsi !=0) { break; }}
      tsr = 1.0 / (*tsi - 1);
      return(*tsi - 1);

<- ext_func(my_stupide(*),myc,stupide).
goal : <- ext_func(my_stupide(V1),myc,stupide) .

0ms sucess
<- ext_func(my_stupide(V1),myc,stupide) .

<-* := my_stupide(2).
goal : <- V1 := my_stupide(2).
130ms sucess
<- 1 := my_stupide(2).

<-* := my_stupide(3).
goal : <- V1 := my_stupide(3).
3ms sucess
<- 2 := my_stupide(3).

<-* := my_stupide(1).
goal : <- V1 := my_stupide(1)

IBM3011 'ONCODE'=0320 'ZERODIVIDE' CONDITION RAISED
   AT OFFSET +0000AC IN PROCEDURE WITH ENTRY stupid
'FINISH' CONDITION RAISED
   AT OFFSET +0000AC IN PROCEDURE WITH ENTRY stupid
FROM OFFSET +3899B8 IN PROCEDURE WITH ENTRY main
 96ms success
   <- 2000 := my_stupide(1).

FIG. 32

```
C ----- We declare the External Function -------------
      INTEGER        PROLOG
C ----- We reserve space for the Return Code ---------
      INTEGER        RETCODE
C ----- We use a sample Call to show the Format ------
      RETCODE = PROLOG('START','BAYOU','BAYOUWS','RESUE',' ')
```

FIG. 33

```
C ----- We declare the External Function -------------
      #include <BAYOU.H>
C ----- We reserve space for the Return Code ---------
      int            Retcode;
C ----- We use a sample Call to show the Format ------
      Retcode = Prolog("START","BAYOU","BAYOUWS","REUSE","")
```

FIG. 34

```
* We Reserve space for all arguments
 01 RETCODE                    PCI S9(09) BINARY.
 01 START-STRCT.
    05 START-LGTH              PIC 9(04) BINARY VALUE 5.
    05 START-STR               PIC X(05) VALUE "START".
 01 BAYOU-STRCT.
    05 BAYOU-LGTH              PIC 9(04) BINARY VALUE 5.
    05 BAYOU-STR               PIC X(05) VALUE "BAYOU".
 01 BAYOUWS-STRCT.
    05 BAYOU-LGTH              PIC 9(04) BINARY VALUE 7.
    05 BAYOU-STR               PIC X(07) VALUE "BAYOUWS".
 01 REUSE-STRCT.
    05 REUSE-LGTH              PIC 9(04) BINARY VALUE 5.
    05 REUSE-STR               PIC X(05) VALUE "REUSE".
 01 OPTION-STRCT.
    05 OPTION-LGTH             PIC 9(04) BINARY VALUE 0.

* We use a Sample Call to Show the Format
  CALL "PROLOG" USING RETCODE,     START-STRCT, BAYOU-STRCT,
                BAYOUWS-STRCT, RESUE-STRCT, OPTION-STRCT.
```

FIG. 35

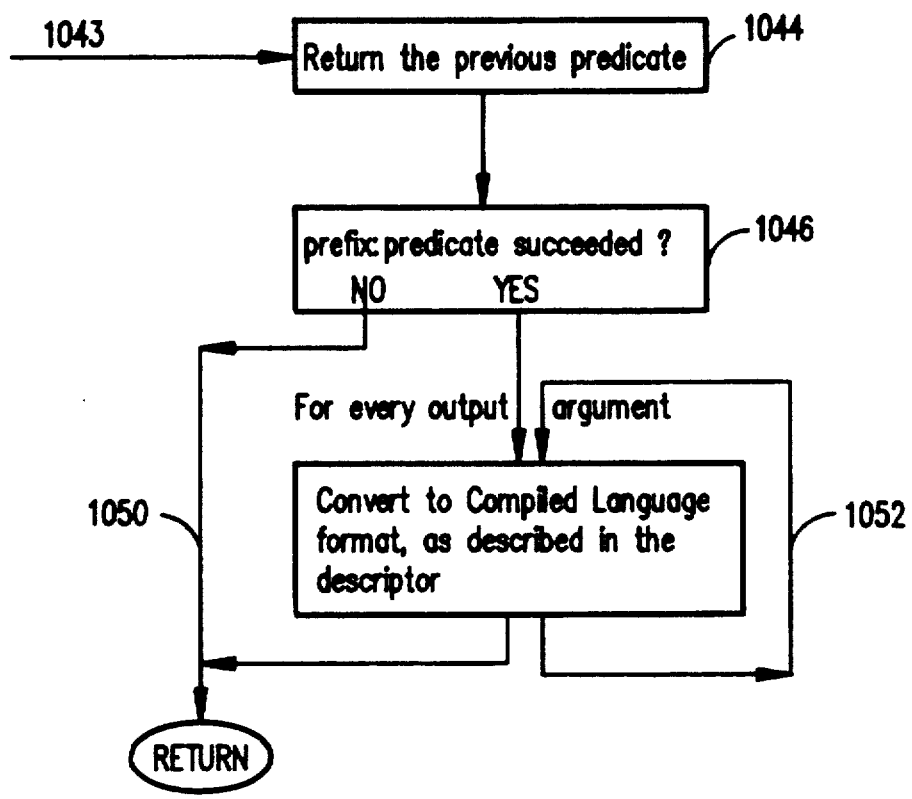
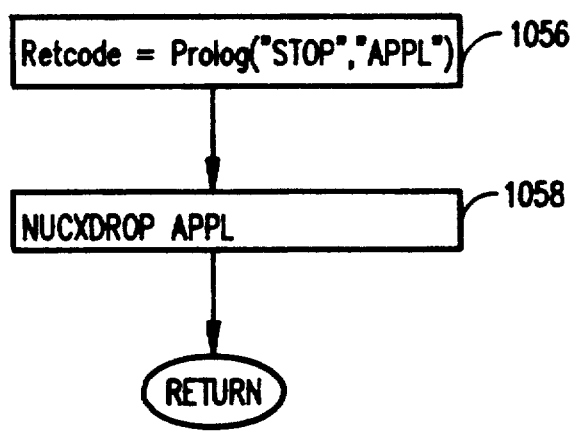
FIG. 37C

METHOD AND SYSTEM FOR ELIMINATING OPERATION CODES FROM INTERMEDIATE PROLOG INSTRUCTIONS

This is a continuation of Ser. No. 07/393630, filed Aug. 14, 1989 and now abandoned.

FIELD OF THE INVENTION

This invention generally relates to improvements in a Prolog interpreter and more particularly to a technique for encoding Prolog instructions without explicit arguments to increase the speed which an interpreter can decode the instructions thus improving overall performance of a Prolog interpreter.

BACKGROUND OF THE INVENTION

This invention is one of a set of improvements that have been made to create IBM's Prolog for the 370. As the name implies, the compiler has been optimized for IBM's 370/XA environment. However, the invention will perform equally well in any other thirty-two bit architecture. So for example, the invention could be practiced on an Indel 80X86 processor or a Motorola 680X0.

The first Prolog interpreter was developed in France by Phillipe Roussel in 1972. His early work was expanded upon and first found a home on an IBM S/370 via work done at the University of Waterloo, Canada. A good summary of the history and content of the Prolog language is contained in a report by David H. D. Warren, "Implementing Prolog", *DAI Research Report No. 39* (May 1977).

In his paper, Mr. Warren describes the two basic parts of the Prolog language: logical statements known as Horn clauses and a control language used by the programmer in constructing a proof. Section 4.1 discloses the Prolog Syntax and Terminology that is basic to the understanding of this invention. The language originated in formal proofs. So, for example, P←Q & R & S is interpreted as, P if Q and R and S. A careful reading of section 4.1 will acquaint the uninitiated reader with an appreciation of the Prolog syntax and major commands.

The Prolog instructions include: get, put, unify, procedural, and indexing instructions. A good summary of the Prolog instruction set is found in another article by Mr. Warren entitled, AN ABSTRACT PROLOG INSTRUCTION SET, Technical Note 309, SRI Project 4776 (October 1983). Mr. Warren's article describes the classical Prolog syntax that is accepted as standard to all Prolog Compilers/Interpreters. Further clarification of the Prolog language is found in, A TUTORIAL ON THE WARREN ABSTRACT MACHINE FOR COMPUTATIONAL LOGIC, Gabriel et al., Argonne National Laboratory (June 1985).

The classical Prolog system is referred to as the Warren Abstract Machine (WAM) in honor of its inventor. The architecture of the WAM is disclosed in Mr. Warren's, *An Abstract Prolog Instruction Set*. The invention is an improvement on the WAM to address some of the problems that Mr. Warren failed to address.

A recent U.S. Pat. No. 4,546,432 to NEC, entitled Prolog Processing System, discusses an efficient method for managing the registers associated with the various Prolog stacks. However, the patent fails to disclose a method for increasing the Prolog address space and improving overall performance by more effectively managing pointers.

As mentioned above, none of the prior art teaches a technique to exploit implicit arguments to implement an optimized Prolog interpreter.

SUMMARY OF THE INVENTION

According to the invention, improvements in a Prolog interpreter are accomplished by replacing the standard Prolog instructions handling objects, such as an atom, by alternate representations of the objects. The other information previously explicitly coded in the prior art WAM instruction, like a register field and a code op field, are managed by the interpreter. The interpreter keeps track of the history of computations by employing a finite state automata using 4 decisions tables. This processing provides extremely fast decoding of the abstract instruction, which positively impacts the interpreter. The improvement removes the previous significant overhead associated with decoding instructions found in prior art Prolog interpreters.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 16 is a correlation table of data types in various languages in accordance with the present invention;

FIG. 17 is a source listing of a C program in accordance with the present invention;

FIG. 18 is a source listing of the Prolog Proargs in accordance with the present invention;

FIG. 19 is an assembler source listing of the binary descriptor formats in accordance with the present invention;

FIG. 20 is a fortran source listing of the main program in accordance with the present invention;

FIG. 21 is a fortran source listing of a sample function in accordance with the present invention;

FIG. 22 illustrates the Prolog declaration of the fortran function STUPID in accordance with the present invention;

FIG. 23 is a listing of the execution of the fortran function STUPID in accordance with the present invention;

FIG. 24 is an example of descriptor declarations in accordance with the present invention;

FIG. 25 is an example of a descriptor file in accordance with the present invention;

FIG. 26 is an example of expressions in accordance with the present invention;

FIG. 27 is an example of a C program in accordance with the present invention;

FIG. 28 is an example of the Prolog to C include file in accordance with the present invention;

FIG. 29 is an example of the C code required in the C main program in accordance with the present invention;

FIG. 30 is a listing of the C text file for the CPLINK function in accordance with the present invention;

FIG. 31 is a listing of the C version of STUPID in accordance with the present invention;

FIG. 32 is a listing of the C execution of STUPID in accordance with the present invention;

FIG. 33 is an example of a Fortran to Prolog interface in accordance with the present invention;

FIG. 34 is an example of a C to Prolog interface in accordance with the present invention;

FIG. 35 is an example of a COBOL to Prolog interface in accordance with the present invention;

FIGS. 37A-37C are a flowchart showing the logic of the external process communication to Prolog in accordance with the subject invention.

DETAILED DESCRIPTION OF THE INVENTION

Basic Prolog Architecture

Figure 1:
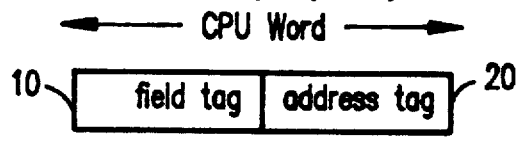
FIG. 1 shows a prior art Prolog record representing an object.

Prolog is architected around four basic processes: 1) Recursive procedure calls, 2) Unification, 3) Backtracking, and 4) Cut Operation. Recursion requires proper stack management to function effectively. Unification is a powerful data handling method that encompasses both comparison and assignment instructions found in conventional programming languages. Unification is dependent on efficient data structure processing. This implies a dependency on pointers which means that any improvement in pointer management translates into enhanced execution.

Backtracking provides restoration of a previous computational environment. Backtracking is similar to the program context save and restore that transpires when an interrupt is processed by a typical operating system. Backtracking requires the efficient management of data structures in order to maintain Prolog system integrity and performance. Backtracking is generally implemented by maintaining a list of current changes. The execution of backtrack is to undo these changes. A similar function to the Prolog backtrack operation in a relational database environment is the "rollback" of a relational data base. The Cut operator commits Prolog processing to all computations performed up to the occurrence of the Cut operator.

A Prolog system is divided into a plurality of data areas. The first is the code area. This area is a read-only area containing the program's instructions and literals. The three major writable data areas of the machine are the local stack, global or heap stack and the trail stack. These three stacks are used as storage areas for the global and local variables and for Prolog system restoration. The global variables are long term variables that are defined by the user and remain active until processing is completed or backtracking and/or garbage collection retrieves the space for Prolog. The local variables are used as temporary storage cells to communicate information from one goal to another. Space can readily be recovered from the local stack when a goal completes and no alternatives remain. Stack manipulation requires efficient management of pointers.

The other writable area is a Last-In First-Out (LIFO) stack called the Trail. The trail is used to store the addresses of variable cells which require resetting to UNDEF when backtracking occurs. The trail grows in size in proportion to the number of goals. Trail size is diminished by backtracking. Registers are used to manage the various stack pointers unique to each of the stacks. Mr. Warren's report discusses the classical Prolog system management of the various stacks and their associated register pointers.

Garbage Collection

Garbage collection is the process whereby stack space is compacted, remapped and returned to the Prolog system to facilitate further processing.

Modern Prolog interpreters and compilers trace their origins to Mr. Warren's original work and to the improvements he has introduced incorporated into a classical standard for a Prolog system.

Instruction Set

Mr. Warren's report discusses the instructions and their syntax and illustrates the assembled code generated from Prolog statements. The description of the preferred embodiment diverges from the incompletely optimized code disclosed in Mr. Warren's report. As highlighted in the report, the Warren Prolog compiler required indirect addressing to acquire information. Thus a separate register must be used as an index register and the information from the instruction is used as an offset. The offset is added to the index register to obtain the effective address.

Prolog instructions are used to implement Prolog programs. Generally there is not a one to one correspondence of instructions and Prolog symbols in a classical Prolog Abstract Machine. A typical Prolog instruction consists of an operation code (opcode) with a plurality of operands. The opcode correlates the type of Prolog symbol with the context in which it occurs. The opcode occupies eight bits or one byte. The operands include small integers, offsets, and addresses. These operands in turn correspond to the various Prolog symbols. Depending on the specific Prolog implementation, operands might occupy a nibble, byte, word or double-word.

Data Objects

Referring to FIG. 1, a prior art Prolog data object is shown. It is represented by a tag field 10 and an address 20. The typical data object occupies thirty-two bits. The tag field distinguishes the type of the term, and must be at least two bits and more commonly eight bits or one byte. The main types are references, lists, structures, lists, skeletons, atoms, and integers. The eight bit tag field leaves only twenty-four bits of addressability. Thus, for example, in the 370/XA environment, full advantage of the thirty-one bit address space is not possible.

As opposed to Fortran, PL/1, COBOL, C and the like, that know about data, variables and assignment of values to the variables, Lisp and Prolog known about data, variables and binding. Variables are either free (no value) or bound (or instanciated). But once a variable in Prolog is instanciated, the variable cannot be re-instanciated, unless the variable is un-bound (by backtracking).

This powerful difference is exploited by Prolog's pattern matching. For example, in an operation of A = B where A and B are Prolog objects (possible variables) tries to unify A and B. If A and B are variables, then the 2 variables become equivalent, and the unification succeeds. If A or B is a variable, then the variable becomes bound (instanciated to the other value), and the unification succeeds. If both A and B are data they are pattern matched to find them equal, possibly unifying recursively variables inside A and/or B. If that occurs, then the unification succeeds, otherwise it fails and a backtrack occurs.

This explains why the Prolog instruction, X = 1, is a notation that binds X to 1 if X is an unbound variable, or checks that X is equal to 1 if X is Bound. A = B is internally performed by the Prolog system placing a pointer to A into B. B = C is accomplished by storing a pointer to B into C. C = hello is completed by putting the address of the atom "hello" into C. To obtain the value of B, the value of the two pointers must be resolved. The use of pointers permeates these steps as it likewise permeates Prolog processing. Thus, any improvement that can be made to pointer processing translates into significant improvements to Prolog execution.

Figure 4:
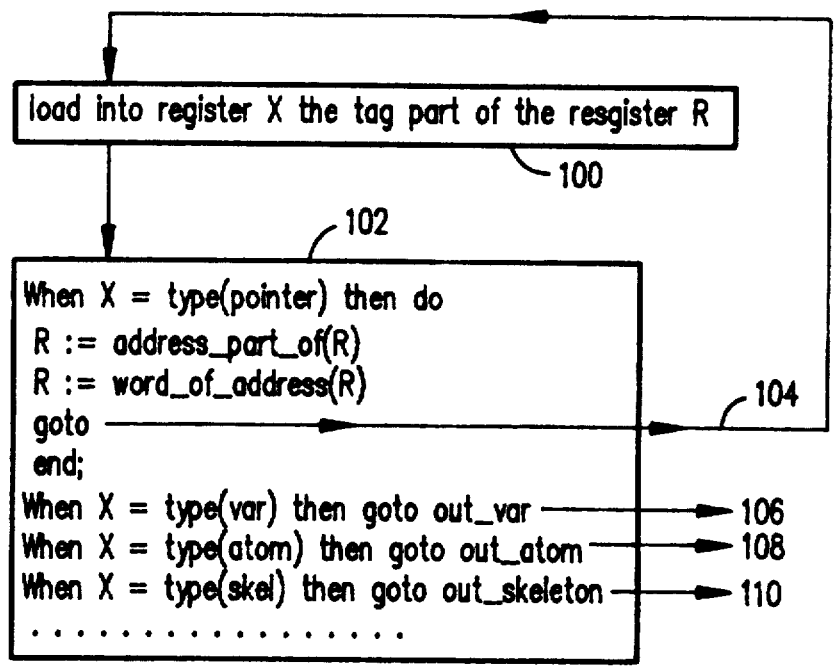
FIG. 4 is a flowchart of a classical prior art approach to Prolog object processing.
Figure 5:
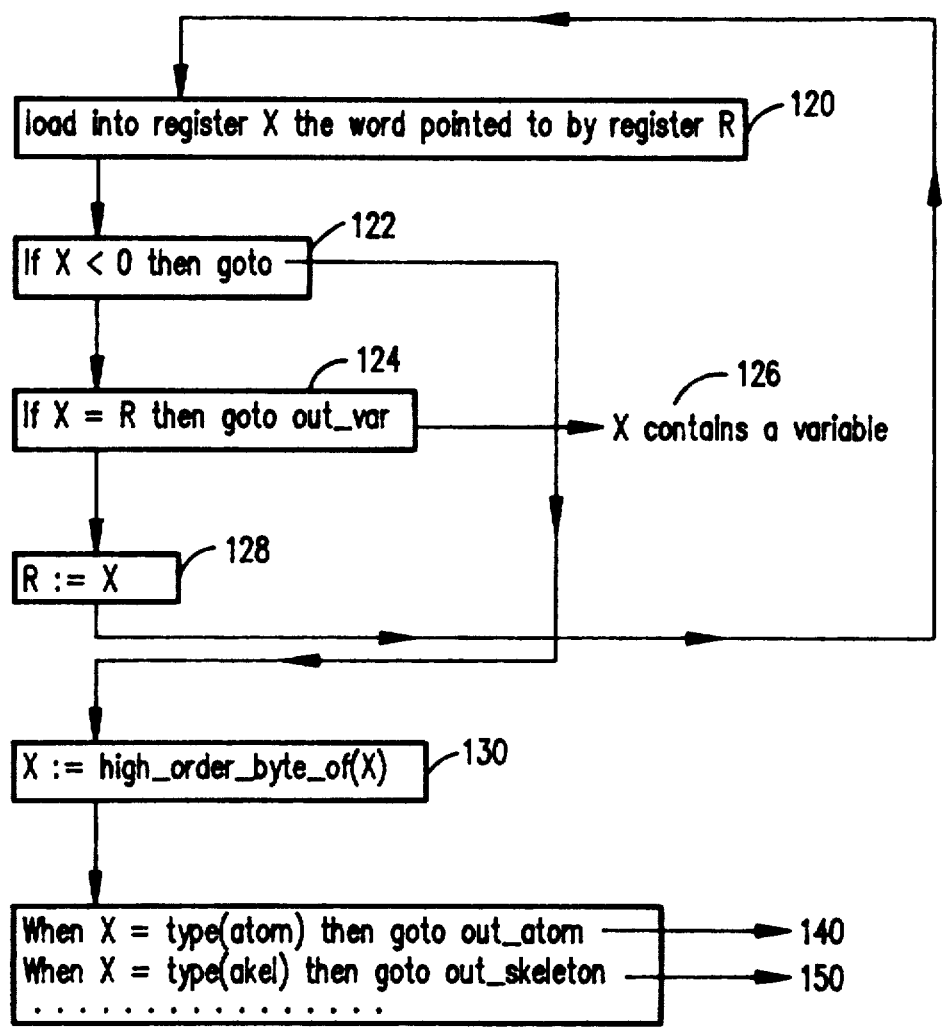
FIG. 5 is a flowchart of Prolog object processing in accordance with the present invention.

FIG. 4 depicts the logic associated with pointer processing in accordance with the prior art. FIG. 5 depicts the logic associated with pointer processing in accordance with the subject invention. These figures are discussed in detail below.

Referring to FIG. 1, a prior art classical Prolog object word is shown. The first byte of information contains the tag field 10. The remaining bytes of information containing the address tag 20. The tag field 10 is an integer value that translates into various types of Prolog objects such as: pointer, free variable, constant (atom, integer, . . . ), or skeleton (Prolog list). The constant employs the address tag 20 as a pointer to the associated descriptor of the constant. The address tag 20 can contain an immediate data instead of an address. Small integers which fit into the space of the address tag 20 are usually represented this way.

The skeleton utilizes the address tag 20 as a pointer to the descriptor of the skeleton. This architecture is limited by the reduced size of the address tag 20 based on the one byte tag field 10. Thus, instead of exploiting a thirty-one bit address space, only twenty-four bit addressing is available. Some implementations of Prolog use a tag field of less than one byte, but none use a single bit because the tag field in classical Prolog must convey numbers ranging from one to sixteen. The one byte architecture is the most prevalent approach since most existing computers have instructions to fetch one byte, but very few computers have instructions to fetch 3 to 5 bits.

Invention Architecture

Prolog objects are "tagged words" of one of the following types:
1) pointer to another tagged word;
2) free variable;
3) small integer;
4) associated to a Prolog object stored in the global stack (which implied the address field points to an object descriptor in the global stack); and
5) associated to a Prolog object stored in the code area (which implies the address field points to an object descriptor in the code area).

The Prolog system of the invention replaces every object of type "free variable" by an object of type pointer whose address field points to itself. It is easy to distinguish a pointer from a free variable, because a pointer never points to itself.

The processing of the subject invention requires a little more setup work in order to initialize the address field, and dereferencing processing requires an additional test. However, the most common set of instructions in Prolog, copying, is optimized.

In a classical Prolog system, to copy an object, the system is required to:
(a) check it is a free variable;
(b) yes, then the object is a pointer to the free variable; and
(c) no, then the copy is the object.

Employing this approach, the copy is always a simple copy.

Put a copy of the type of the object of categories (4 & 5) at the beginning of the object descriptor. This addition does not matter in the code area because it is static code and to add this byte to the objects of the global stack makes it possible to linearly browse the global stack, making garbage collection compaction easier. In each tagged object, except small integer, the address part of the object points to another pointer or to a tagged word.

The next step is to suppress the type small integer and to use only the type integer. The drawback is that a small integer is represented by only one pointer. This problem can be solved for very small integers by creating a table of them in constants area.

Now for each tagged object, the address part is a valid pointer pointing to another pointer or to a tagged word. Each tagged object is either:
1) of tag pointer; or
2) of another tag, which can be recovered using the value pointed to by the address field.

The tag field is no longer necessary because it can be recovered trough the object descriptor. We need only to be able to distinguish between an object of type pointer, which will point to a pointer, and an object of type free variable which points to an object descriptor. This is accomplished by setting the high order bit of the object descriptor and by restricting the address space to 31 bits as described in detail below. The high order bit is used because it is the easiest to test on an MVS/XA machine, and it is not used in addressing. One skilled in the art will recognize that the low order bit could be substituted without undue experimentation.

Figure 2:
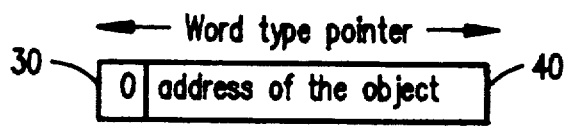
FIG. 2 depicts a Prolog word of type pointer in accordance with the present invention.
Figure 3:
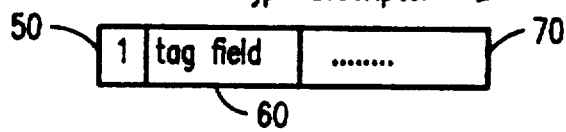
FIG. 3 depicts a Prolog word of type descriptor in accordance with the present invention.

The invention employs two kinds of object words illustrated in FIGS. 2 and 3. FIG. 2 shows an object of type pointer in accordance with the invention. The first bit 30 of the thirty-two bit word is a type field. The type field differentiates between object words of type pointer and type descriptor. If the bit is non-zero, then the type is descriptor. The next thirty-one bits of information 40 are the address of the Prolog object. Thus, the full address space of the 370/XA environment is exploited.

FIG. 3 represents a Prolog object word of type descriptor in accordance with the invention. The first bit 50 is set to one to indicate the descriptor type. The next seven bits are used in the classical Prolog approach as a tag field 60. The remaining twenty-four bits 70 vary based on the tag field's 60 value. Some examples are provided later to clarify the usage of the implementation of the various objects.

One of ordinary skill in compiler technology will readily comprehend the advantages gained through this architecture. A simple bit test will suffice to differentiate a Prolog object word of type pointer from any other object. Then, the address is already in executable form. This contrasts with the prior art technology where the tag field occupied eight bits.

An initial COMPARE operation was necessary to determine the type of the Prolog object word. Then, another AND operation was necessary to remove the tag field leaving only the twenty-four bits for an effective address. Thus, the full thirty-one bit address space could not be exploited, and additional processing overhead was associated with each pointer object. Since the pointer object is essential to Prolog processing, and one of the most commonly used objects, optimization of compiled and interpreted Prolog code was severely diminished.

The invention significantly reduces the overhead associated with Prolog pointer object processing. A simple test of the object word is completely determinate of the pointer's address. Thus, no further processing is necessary before the address is available for execution. The masked compare and the AND operation to strip the tag field is completely eliminated.

FIG. 4 is a flowchart showing an example of classical Prolog object processing in accordance with the present invention. The example dereferences a Prolog object contained in register R.

Processing commences at function block 100 where the tag field contained in register R is loaded into the user-specified register X. Then, in function block 102, the register X is tested to determine if it is a pointer or other type of object. If it is a pointer, then load register R with the twenty-four bit address in R and load the word of information at the address in R as the effective address of the pointer.

Alternately, if the test of the type indicates a variable, then a branch is made at 106 to a routine to process a Prolog variable. If the test of the type indicates an atom, then a branch is made at 108 to a routine to process a Prolog atom. If the test of the type indicates a skeleton, then a branch is made at 110 to process a Prolog skeleton.

FIG. 5 is a flowchart of the detailed logic associated with Prolog object processing in accordance with the subject invention. Function block 120 loads the word pointed to by register R into register X. Then, decision block 122 tests for a negative number in register X.

If X is positive, then Prolog executes the statement "If X=R then go to out-var" in function block 124. The branch to "out-var" means that X contains a variable, so the information is processed as a variable at 126. Otherwise, the contents of register X are copied into register R at function block 128 and processing is complete.

If register X was initially negative, then at function block 130 the high order byte of X is loaded into the low order byte of register X and the high order three bytes are shifted out. Then, in function block 135, the type is tested to determine if it is an atom or a skeleton. If it is an atom, control is passed to an atom Prolog object processor at 140. If it is a skeleton, then control is passed to a skeleton Prolog object processor at 150.

Figure 6:
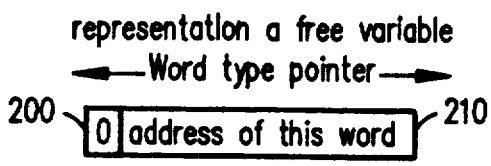
FIG. 6 depicts a Prolog representation of a free variable in accordance with the present invention.

FIG. 6 is a representation of a free variable in a Prolog object word in accordance with the present invention. Since a free variable in Prolog is actually a location in memory, the object is effectively an address. Thus, 200 is set to zero and the remaining thirty-one bits 210 are the effective address of the variable. This implies that a test of the Prolog object word will indicate that the object is an address and the information at the address can be processed as variable information. A substantial savings in processing overhead is accomplished. Further, the effective storage area for variables is increased dramatically.

Figure 7:
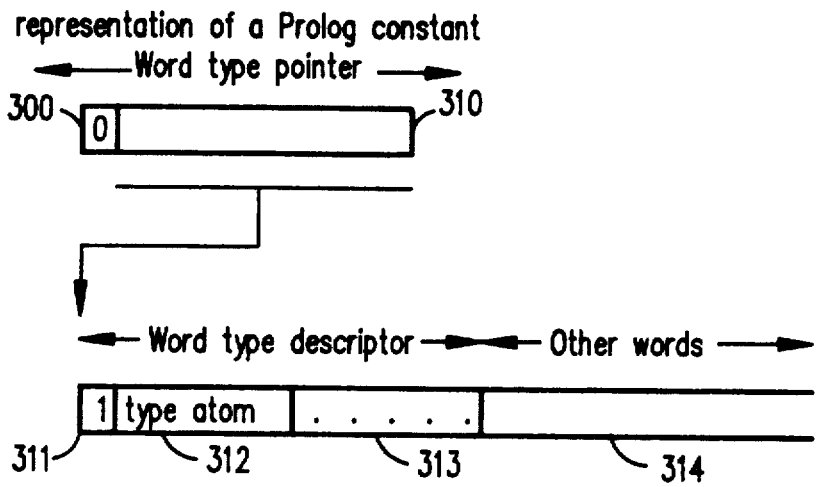
FIG. 7 depicts a Prolog constant in accordance with the present invention.

FIG. 7 is an example of a constant in a Prolog object word in accordance with the invention. The particular constant is a Prolog atom. Thus, the first bit 300 is set to zero to indicated the object is a pointer, and the remaining thirty-one bits 310 are an address to the data structure associated with the atom.

The data structure is stored in memory as shown at 311, 312, 313 and 314. The first bit 311 indicates that the object word is not an address. Thus, the next byte of information 312 is a tag field processed to determine the type of Prolog constant. In this case an atom. The bytes following (313 and 314) the tag field 312 vary depending on the type of Prolog constant. Even in a nonpointer object, processing advantage is available through exploitation of the Prolog object architecture in accordance with the invention.

Figure 8:
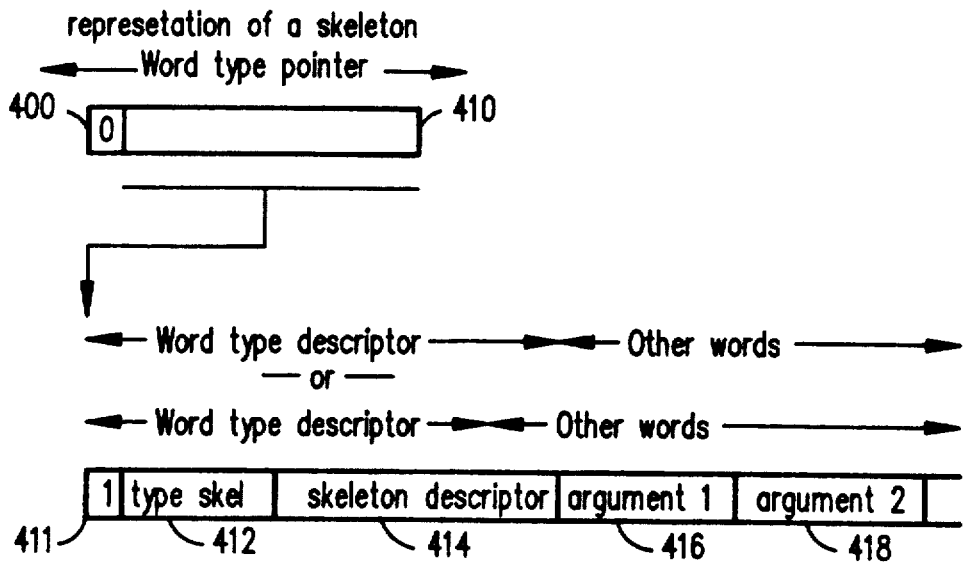
FIG. 8 depicts a Prolog skeleton in accordance with the present invention.

FIG. 8 is an example of a skeleton in a Prolog object in accordance with the invention. A skeleton is represented as a pointer to a data structure containing information pertinent to the particular skeleton. Thus, the first bit 400 of the skeleton is set to zero to indicate that an address is contained in the remaining thirty-one bits 410. The address is used as a pointer to the data structure associated with the skeleton 411, 412, 414, 416, and 418.

The first bit of the data structure 411 is set to one to indicate that the next seven bits 412 are a tag field value. In this case the value indicates that the data structure is a skeleton. The remaining information 414, 416 and 418 is a classical Prolog skeleton data structure.

Implicit Arguments

Figure 9:
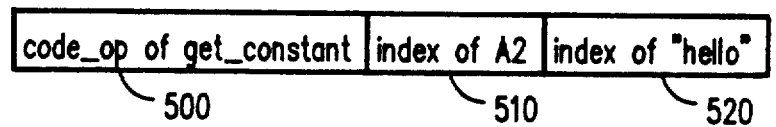
FIG. 9 illustrates a prior art Prolog get_constant instruction.

In classical implementations of Prolog, such as the Prolog interpreter/compiler of Mr. Warren described earlier, instructions require the explicit recitation of a plurality of fields as illustrated in FIG. 9. So, for example, the code for the second argument of a (*,hello) instruction is get_constant hello, A2 and is encoded as shown in FIG. 9.

The fields of the second argument of the instruction include code_op 500, a reference to the register that is used for the operation 510, and an index to the constant 520. Each of the fields must be separately parsed to verify the correct information was provided. Also, an index field, like 520, requires the value contained in the index field be added to the appropriate offset register to obtain the address of the constant. These operations are time consuming and account for much of the degradation of execution speed associated with an interpreter.

Figure 10:
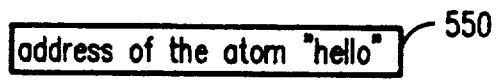
FIG. 10 illustrates a Prolog get_constant instruction in accordance with the present invention.

The invention simplifies the instruction format as shown in FIG. 10. The only information required in the instruction is the address of the constant 550. The instructions are differentiated from objects as described above by testing the first bit (sign bit).

If the word of information is negative (one bit), then an instruction is present. If the word of information is positive (zero bit), then a pointer to a Prolog object is present. Thus, in our example, the second argument of the instruction is encoded as a word of information whose first bit is set to zero and the additional thirty-one bits of information are a pointer containing the address of the constant "hello".

The interpreter has all the information necessary to carry out the get_constant instruction without any further preliminary processing. The register used for the get_constant is implicitly assigned by the interpreter based on current allocation of the registers. There is no explicit assignment of the register by the instruction.

The register field in the instruction can be omitted from the Wam generated code for d(U*V,X,(DU*V)+(U*DV)):

```
get_structure '*'/2,A1      % d(*/2(
unify_variable A1           % U,
unify_variable Y1           % V),
get_variable Y2,A2          % X,
get_structure '+'/2,A3      % +/2(
unify_variable A4           % SS1,
unify_variable A5           % SS2),
get_structure '*'/2,A4      % SS1 = */2(
unify_variable A3           % DU,
unify_value Y1              % V),
get_structure '*'/2,A5      % SS2 = */2(
unify_value A1              % U,
unify_variable Y3           % DU)
```

Can be replaced with the inventive coding scheme by adding two new instructions shown below.
unify_stack
Unify_stack works like unify_varible, but instead of storing the argument in a register, it stores the argument in a stack.
pop_structure F
Pop_structure F works like get_structure F, Ai excepts that it pops a word from the stack and uses this word instead of Ai.

With these instructions the prior art code shown above can be rewritten as shown below.

```
get_structure '*'/2,A1      % d(*/2(
unify_variable A1           % U,
unify_variable Y1           % V),
get_variable Y2,A2          % X,
get_structure '+'/2,A3      % +/2(
unify_stack                 %
unify_stack                 %
pop_structure '*'/2         % = */2(
unify_value A1              % U,
```

-continued

| unify_variable Y3 | % DU) |
| pop_structure '*'/2 | % = */2( |
| unify_variable A3 | % DU, |
| unify_value Y1 | % V), |

Now, in the above code, the first get_... instruction always uses A1 and the next get_... instructions of indice i use Ai. It is possible to add a new register S0 which is reset by instructions like try_... (before beginning the processing of a predicate) and which is incremented by one each time a get_... instruction is executed. Thus, each get_... uses as register argument, the register of index S0, so this argument does not need to be explicitly coded as part of the instruction. The same steps are equally effective for the put_... instructions.

Figure 11:
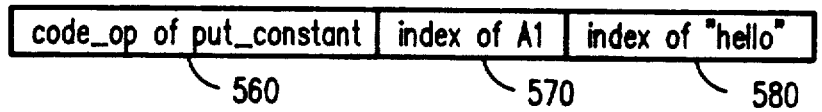
FIG. 11 shows a prior art Prolog put_constant instruction.

The first argument of the predicate of a tail of a clause for the Prolog instruction b(hello) is put_constant hello,A1, and the classical encoding of the first argument is shown in FIG. 11. The code_op of the instruction 560 is a value indicative of the put_constant instruction.

The code_op 560 is followed by a reference to the register that is used for the operation 570, and an index to the constant 580. Each of the fields must be separately parsed to verify the correct information was provided. Also, an index field, like 580, requires the value contained in the index field be added to the appropriate offset register to obtain the address of the constant. These operations are time consuming and account for much of the degradation of execution speed associated with an interpreter.

An alternative is to put the full constant in the instruction instead of coding it as an offset or an address. This technique makes fetching of the constant a little faster, but generates a larger instruction.

Figure 12:
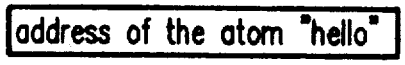
FIG. 12 shows a Prolog put_constant instruction in accordance with the present invention.

FIG. 12 shows the encoding of the first argument in accordance with the subject invention. Since the address of the constant "hello" is all that is required for the instruction, a word of information with the sign bit set to zero is sufficient to completely convey the information required for the first argument. Once again, no explicit recitation of an argument value is necessary for the interpreter to execute the instruction. Further, no processing time for indirect indexing is required to obtain the address of the constant.

Alternatively, as all abstract instructions begin with an op code of one byte and a Prolog object is a tagged word, where the first byte is the tag, it is possible to choose for op code of the unify_constant instructions, the value of the type atom. Thus, the unify_constant "hello" instructions can be replaced by the representation of the atom "hello". It is also possible to do that for get_constant, put_constant, put_structure and get_structure with the type skeletons.

Figure 13A:
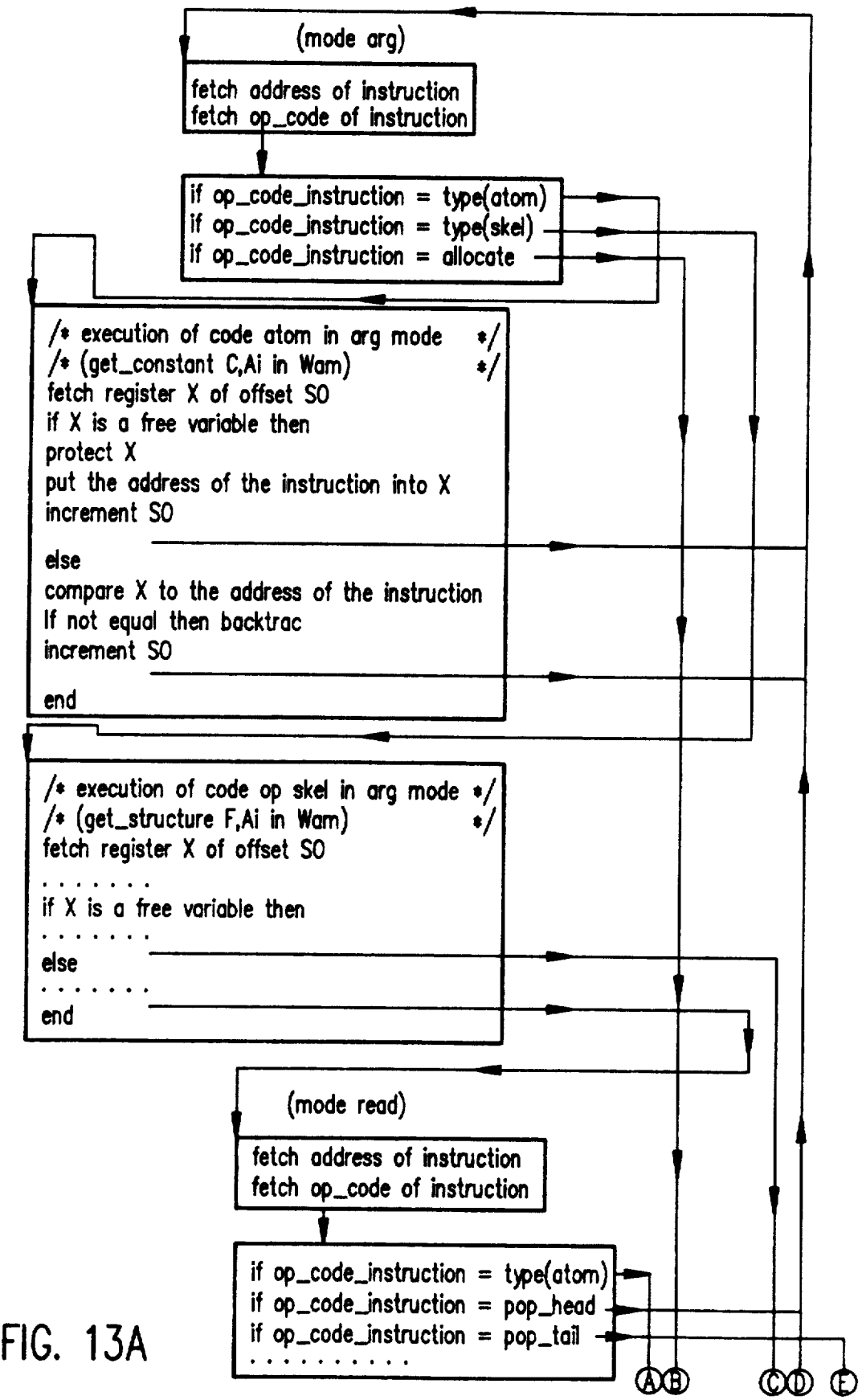
FIGS. 13A-13C are a flowchart depicting the logic of instruction processing in accordance with the present invention.
Figure 13B:
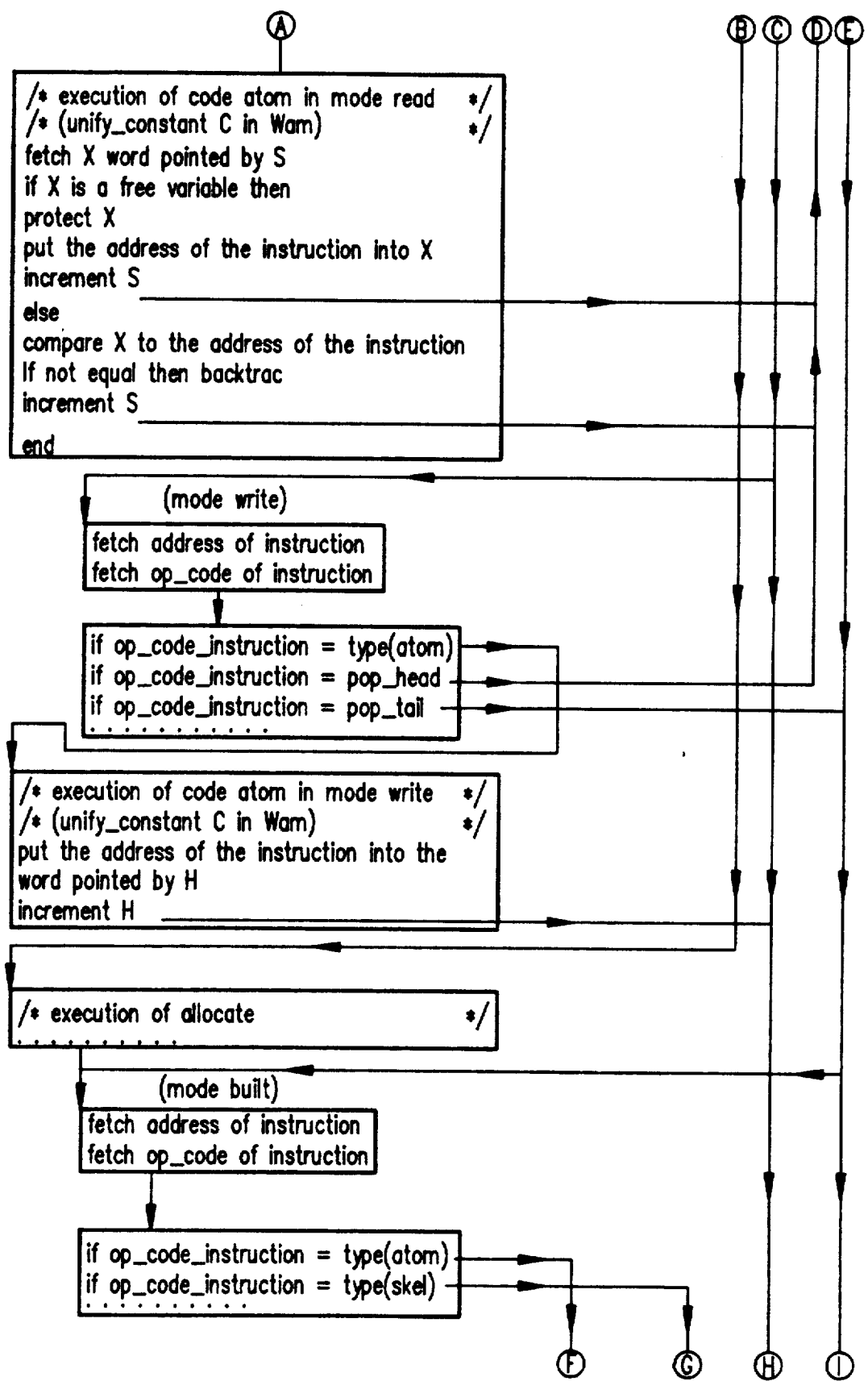
Figure 13C:
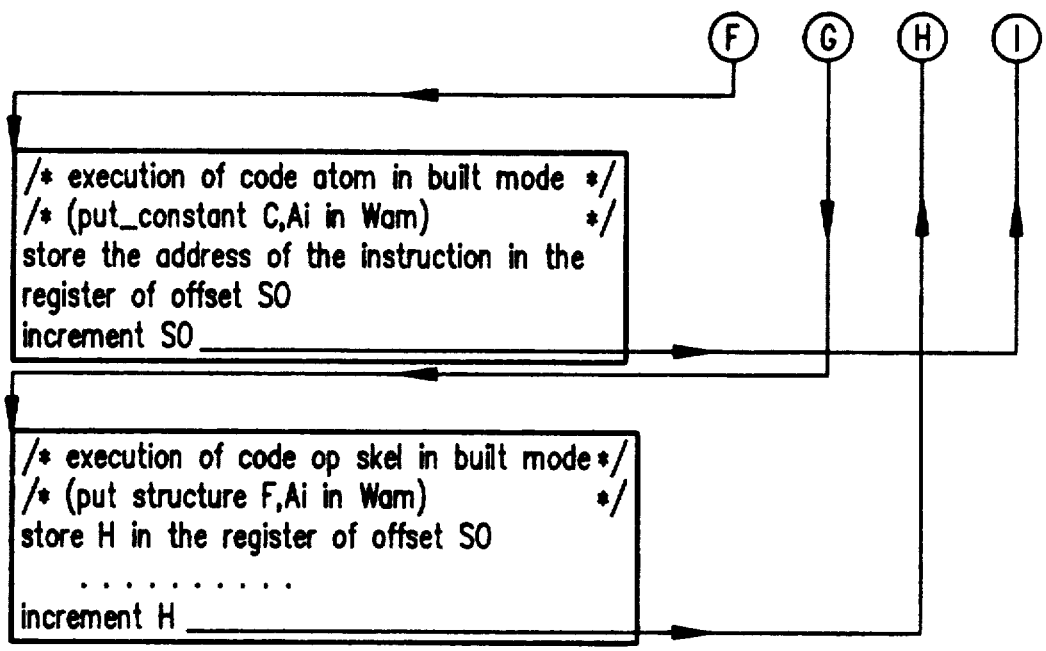

Now if this transformation is applied to both unify_constant, put_constant and get_constant, the problem is that each of these instructions have exactly the same representation. This problem is overcome by employing a finite automata processor as shown in FIGS. 13A-13C. The separate instructions are distinguished by using a 4 main state automata. The states are arg, built, read, and write. The automata avoids the step of performing an explicit test of the execution mode (read/write) during the processing of any of the unify_... instructions.

In some case, the context is not sufficient to allow the automata to predict the mode of the next instruction. For example, if an atom, which has to be interpreted has an unify_constant, is followed by a get_variable, the automata knows that the get_variable has to be executed in an arg mode. However, if an atom, which has to be interpreted as a unify_constant, is followed by another atom, this is fine if the second atom has to be interpreted as an unify_constant, but if it has to be interpreted as a get_constant, then the code generator must insert a pop_head instruction between these instructions. Pop_head implies emulation has to go further in arg mode.

Prolog instructions generally have a format containing an opcode and a plurality of fields similar to the get_constant and put_constant instructions provided above. Any instruction that previously required an explicit register recitation and/or an implicit address calculation realize significant improvements in execution by suppressing the need to decode arguments that are displaced by the invention.

FIGS. 13A-13C is a flowchart graphically depicting the logic associated with instruction processing in accordance with the invention.

Interrupt Processing

One of the inventive features of the Prolog system is the new notion of interrupts in Prolog. Some multi-tasking capability is necessary in Prolog, but adding interrupt processing is extremely difficult because Prolog uses pre-allocated linear stacks. Thus, a copy of the entire stack is required for each Prolog task to assure system integrity is maintained. Interrupt processing is easier to implement because all of the interrupted programs can share the same stacks.

Interrupt processing is possible by setting a flag registering the occurrence of an interrupt. Then, each time that a new predicate is fired, the flag tracking interrupts is checked to determine if an interrupt has occurred and to initiate processing of the interrupt. This architecture restricts interrupt processing to a single location within Prolog system processing thus exploiting standard Prolog predicate processing mechanisms. Allowing the execution of a predicate to be preempted at any time by the execution of another predicate makes the writing of an optimizing complier for Prolog very difficult.

The introduction of two kinds of interrupts is used to diffuse this problem. The first, TYPE 1, alters execution so that when an interrupt, such as predicate p(X), is activated instead of the current predicate c( . . . ), the executed goal is:

p(X) & c ( . . . ).

NOTE: the execution of p(X) may fail or create some backtrack nodes.

The second, TYPE 2, alters execution so that when an interrupt, such as a predicate p(X), is activated instead of the current predicate c( . . . ), the executed goal is:

(p(X) & fail; true) & c ( . . . ).

NOTE: the execution of (p(X) & fail; true) will never create a backtrack or modify the instantiation state of the Prolog variables.

TYPE 1 interrupts introduce backtrack nodes in a rather random way and their use in fully compiled code is limited to a small subset of specific interrupts. The content of the Prolog stack is exactly the same before and after the execution of TYPE 2 interrupts, so Prolog can ignore TYPE 2 interrupts when it performs long range optimization of the compiled program. Thus, a TYPE 2 interrupt can be activated before the activation of any predicate of a compiled Prolog code.

Interrupts are useful in Prolog for:
1. activating frozen predicates;
2. debugging step-by-step;
3. activating the garbage collector; and
4. allowing users to process asynchronous events.

Non-Polling Techniques For Interrupt Processing

The PROLOG system must avoid software polling for interrupts during execution to optimize execution. Logical interrupts and daemons are used to provide non-polling interrupt processing. Logical interrupts are software concoctions that register the occurrence of asynchronous events occurring during the execution of a PROLOG program. The event eventually initiates another PROLOG program called a Daemon defined by PROLOG or customized by a user Prolog program. The best analogy to a Daemon in classical computer processing is a task. A task is a set of instructions often for a single purpose that often requires specific inputs to execute. Tasks can be suspended while they await completion of other tasks that may feed information to a suspended task. A Prolog Daemon is initiated to process the interrupt during the designated time between predicates. Some examples of logical interrupt processing are provided below.

Delayed Evaluation

Predefined PROLOG logical interrupts include delayed evaluation. Delayed evaluation is the instantiation of a frozen variable. A frozen variable is a variable awaiting the completion of another goal to complete its processing. The Daemon is the waiting predicate in this example. A frozen variable is a special unbound variable. When a value is given to this variable, a user defined Prolog predicate is triggered.

GARBAGE COLLECTION

The logical interrupt is the global of trail stack overflow, and the Daemon is the garbage collector. When a stack overflow occurs, the size of the stack is incremented by a small amount to allow the Prolog process to continue until the next Type 1 interrupt is detected. Then, the garbage collector processes the stack to reclaim space. The small incremental areas, one for the trail stack and one for the global stack, are preallocated when the stacks are initialized.

The garbage collection cannot be done when the stack overflow occurs, but occurs at the activation of the next predicate. This is due to the uncertainty of leaving elements in the middle of a computation.

STEP BY STEP DEBUGGER

The logical interrupt is the step from one predicate to the next, and the Daemon is the Debugger itself.

EXTERNAL TERMINAL INTERRUPT

The logical interrupt is the action of the user via terminal entry, and the Daemon is the PROLOG user code that is discussed above as the handler of the terminal interrupt.

Interrupt Processing Logic

The interrupt events are captured asynchronously from normal PROLOG execution via logical interrupt processing. However, the events are analyzed and processed at execution "safe points" only. The "safe points" occur at the switch from one predicate to the next predicate. At that moment, PROLOG must check to determine whether any pending interrupts require attention. This determination requires only a test of a memory location (flag), approximately two instructions:
1. test Flag for pending interrupt, and
2. branch on Flag to the logical interrupt handling routines.

PROLOG clearly needs a better way to handle pending logical Interrupts without testing for them explicitly. The invention exploits the common invocation mechanism of predicate processing used in all Prolog systems. All predicates whether interpreted, incrementally compiled, or fully compiled, use the same (short) sequence of instructions commonly located in a permanent read-write area named "CSINT". At location "EXEC" in "CSINT" the predicate invocation sequence starts.

When no logical interrupt is pending, the sequence locates the next predicate execution address and branches to the predicate for normal execution. This is standard Prolog predicate processing. However, when a logical interrupt is pending, the first instruction of that sequence is replaced by a branch to the logical interrupt handler routine.

The replacement occurs when the asynchronous event occurred, that is, when the logical interrupt was recorded. In addition to setting the interrupt trap in the "EXEC" instruction, the logical interrupt enqueues on an external logical interrupt queue. When branched to from "EXEC", the logical interrupt handler transfers the contents of the external queue, to the internal logical interrupt queue, and the external queue is emptied. Careful use of the external queue is necessary to assure that its modification in the logical interrupt recording routine, and the logical interrupt handling routine, employ a "CS" instruction (Compare and Swap).

During the transfer from the external queue to the internal queue, the logical interrupts are ordered by priority. Then the pending logical interrupt with the highest priority is dequeued and its associated daemon is scheduled for execution.

If the internal queue is emptied by the dequeuing, then the interrupt trap reverts to its normal value and executes the normal, next predicate.

Detailed Interrupt Logic

Figure 14:
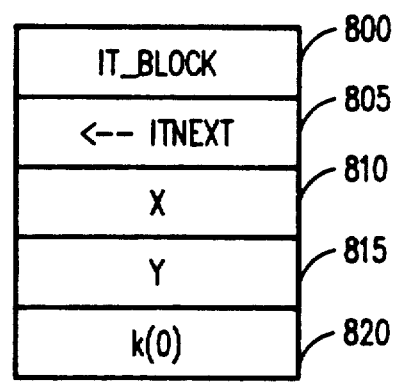
FIG. 14 is an illustration of a data structure employed in interrupt processing in accordance with the present invention.

When an interrupt associated with a predicate p(X,Y,k(0)) is detected, the control block shown in FIG. 14 is constructed in the heap stack to process the logical interrupt. IT_BLOCK 800 is the address of the predicate descriptor of p(*,*,*). ←ITNEXT 805 is a pointer to the address of the next interrupt control block, or zero if there are no other interrupts that require processing. X 810 is a pointer to the globalization information for X. Y 815 is a pointer to the globalization information for Y. k(0) 820 is a pointer to the globalization information for k(0).

Two global words in common storage, WAITITS and WAITITU are used to flag the occurrence of an interrupt. WAITITS is used to flag interrupts sensitive to backtracking, while WAITITU is used to flag interrupts insensitive to backtracking. The word WAITITU/WAITITS contains a zero if no interrupt has occurred or the address of the first interrupt control block if an interrupt has occurred. The interrupt trap is set when WAITITU or WAITITS is non-zero. There is use for both interrupts sensitive to backtrack and insensitive to backtrack. For example, if there is a Prolog interrupt associated with system command Stop Predicate (SP), and if the predicate Prolog associated to the interrupt is defined as 'stop the execution of the current command', then after someone has entered the SP command, the associated Prolog interrupt will be activated and will stop the execution. Even if backtrack is activated between the entering of the SP command and the execution of the associated interrupt the program is stopped. Thus, this kind of interrupt is insensitive to backtrack processing.

An example of an interrupt that must be sensitive to backtracking is shown below.
a(4,0).
a(_,_).
:-ge(X,0) when not var(X), a(X,1).
'ge(X,0) when not var(X)' activates the interrupt associated with
ge(X,0) as soon as X receives a value.

In the example, the execution is the goal :- a(X,1) tries to unify a(X,1) with a(4,0). To do that it binds X to 4. This triggers the interrupt associated with ge(X,0). Now ge(4,0)), so ge(4,0) will be added to the list of active interrupts. Then, Prolog attempts to unify 1 and 0. This step fails, so that backtrack activates. This backtrack restores X to the free state. As the interrupt ge(X,0) is related to the fact that X is not a variable, ge(X,0) must be removed from the list of active interrupts to avoid error. This kind of interrupt needs clearly to be sensitive to backtrack.

Following the update of the WAITITU/WAITITS word, an interrupt control block similar to FIG. 14 is added at the end of the linked list of interrupt control blocks anchored by the address contained in WAITITU/WAITITS. If an initial interrupt control block is already present, then the chain of next interrupt pointers 805 is traversed until a next interrupt pointer 805 equal to zero is found. The zeroed next interrupt pointer 805 is updated with the address of the new interrupt control block. Then, if backtracking is necessary to restore processing following the interrupt, information for backtracking is pushed onto the trail stack so backtrack will restore the proper values after interrupt processing.

The Prolog EXEC predicate processor is modified to check the contents of WAITITS/WAITITU before executing the next predicate. If a non-zero value is detected, then the first interrupt control block is activated and the associated WAITITS/WAITITU word is updated with the next interrupt control block found in INTEXT 805.

If the update is on the WAITITS, then the trail stack is also updated. Next, a new frame is created by executing an allocate instruction and pushing the predicate descriptor of Proc and the arguments of Proc into the local frame. The arguments of p(*,*,*) are loaded in the Ai registers from the interrupt control block 810, 815 and 820. Then, the continuation pointer is set to the system address ITRET and the clauses associated with the interrupt are activated.

When interrupt processing is completed, Prolog returns to the address at ITRET and perform the following operations. First, the Ai registers are reloaded from the previous frame by employing the continuations pointer. Then, the predicate descriptor, E and P pointers are reloaded from the frame. Finally, execution commences from the address specified by the predicate descriptor.

FIGS. 15A-15F is a block diagram showing the logic associated with adding interrupt processing to Prolog in accordance with the subject invention. The stacks and other elements of Prolog are described in detail in the preceding text.

Figure 15A:
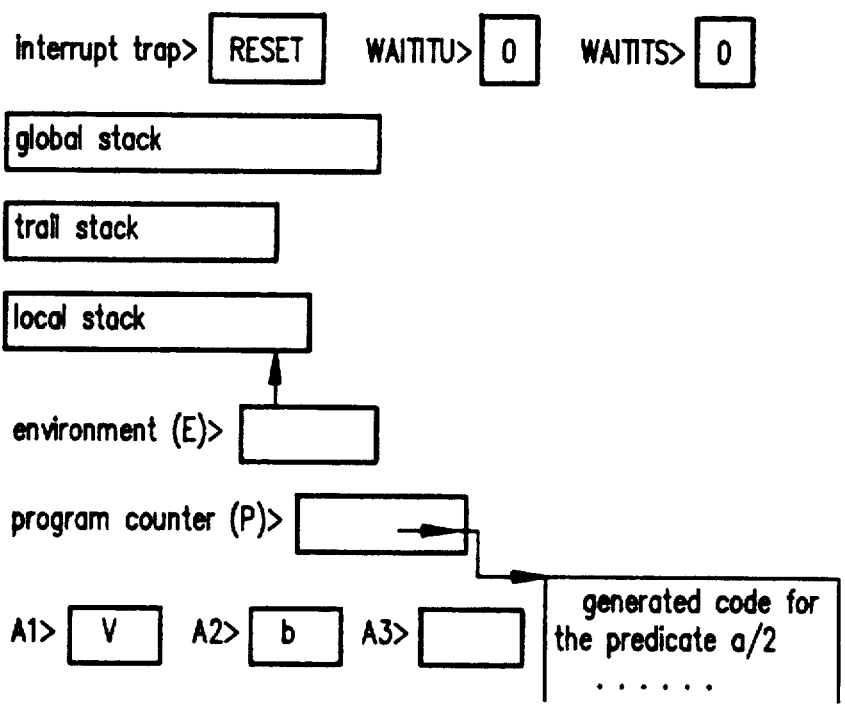
FIGS. 15A-15F are block diagrams showing the logic associated with adding interrupt processing to Prolog in accordance with the subject invention.

FIG. 15A shows the state of Prolog when the test for interrupt is done before the execution of an example predicate a(V,b) when no interrupt is active.

Figure 15B:
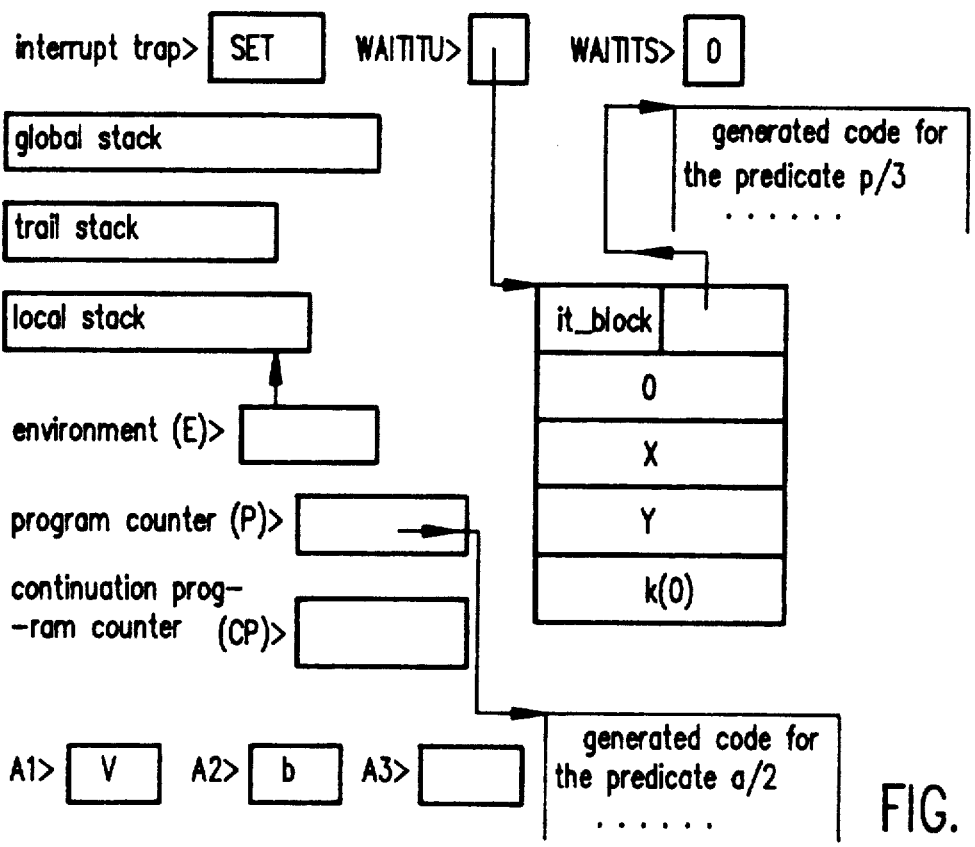

FIG. 15B shows Prolog's state before the test for interrupt execution just before the execution of the predicate a(V,b) when a Type 2 interrupt associated with predicate p(X,Y,k(O)) is waiting.

Figure 15C:
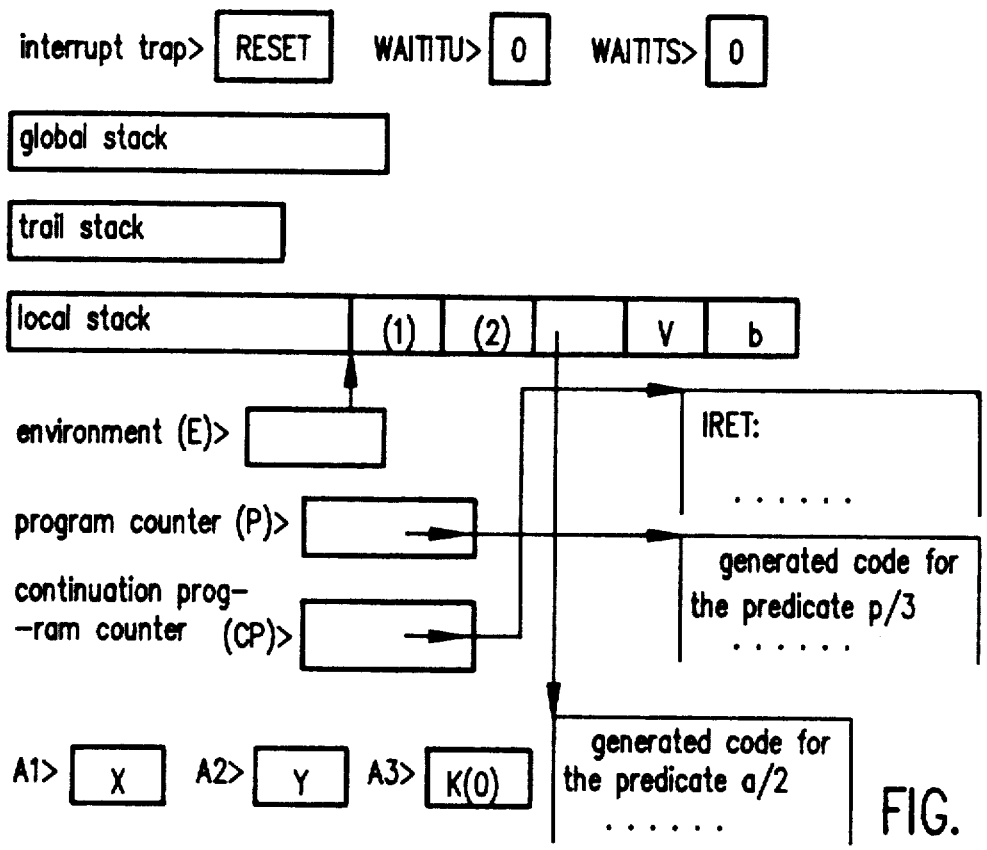

FIG. 15C shows Prolog's state when a Type 2 interrupt associated with the predicate p(X,Y,k(O)) has been processed before the execution of the predicate a(V,b).

Figure 15D:
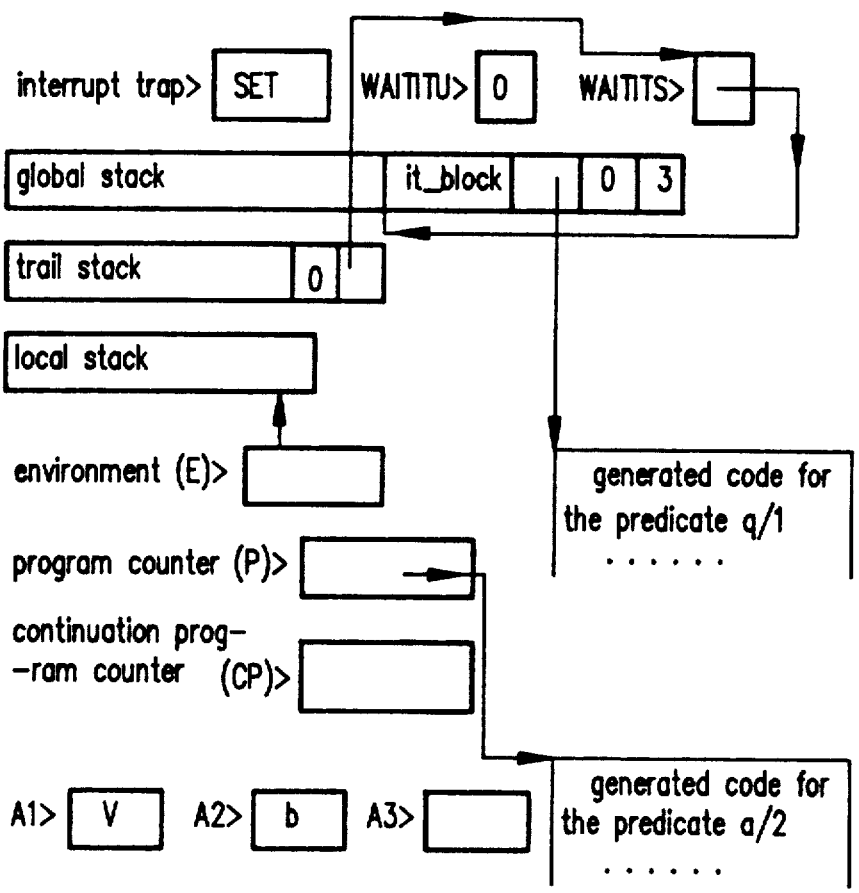

FIG. 15D shows Prolog's state before testing for interrupt prior to the execution of predicate a(V,b). There is a Type 1 interrupt associated with the predicate q(3) waiting.

Figure 15E:
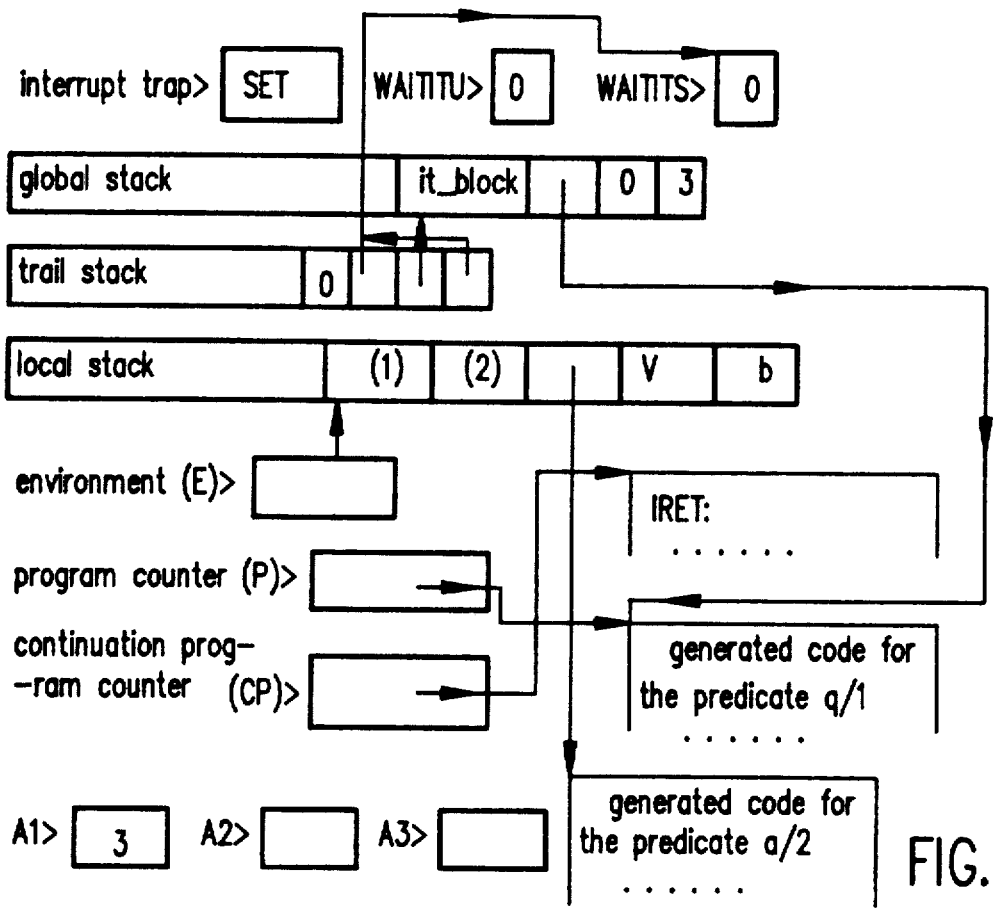

FIG. 15E shows Prolog's state when a Type 1 interrupt associated with the predicate q(3) has been processed before the execution of the predicate a(V,b).

Figure 15F:
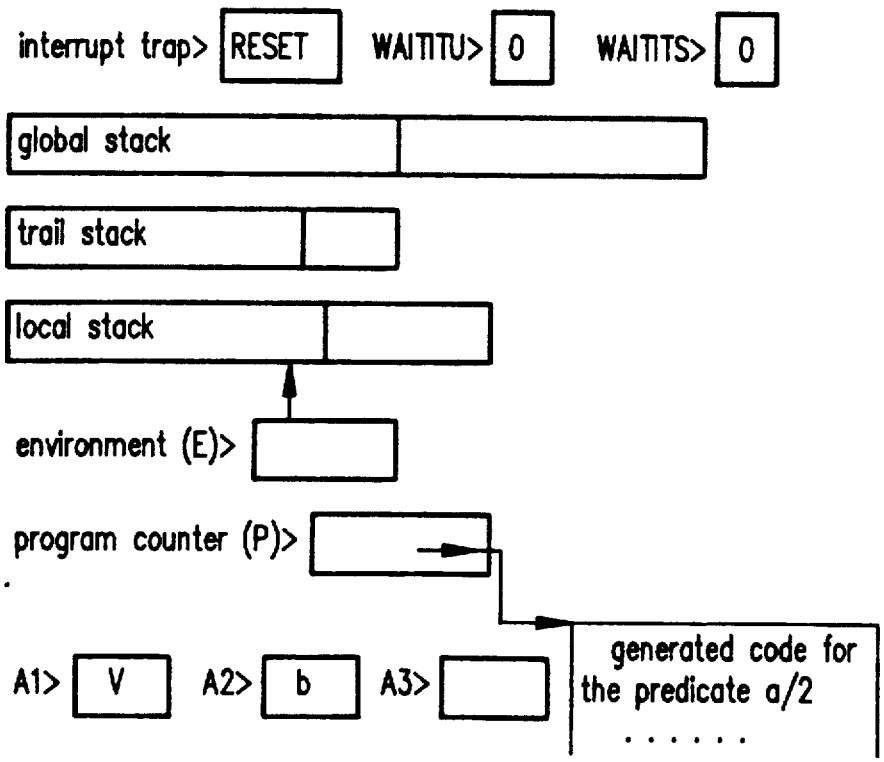

FIG. 15F shows Prolog's state when a Type 1 interrupt associated with the predicate q(3) was processed just before the execution of the predicate a(V,b).

Rerouting the first instruction of the common invocation sequence facilitates PROLOG's logical interrupt processing without any polling overhead.

General Language Interface

The details of the data structures used by Prolog to interface to other programming languages are presented below. The data structures are employed in the conversion of data arguments from Prolog to other languages. The data structures and other processing described herein provide capability heretofore unknown in Prolog.

Argument Descriptor

Prolog is able to call procedures written in C, Cobol, Fortran and PL/1. Prolog may transmit arguments to the procedures, formatted as the language requires.

To convert the data arguments from the Prolog format to the format expected by the procedures, Prolog uses a descriptor table employing processing that macro-expands the Prolog information to the format that the target language expects to receive.

The descriptor table enables Prolog to convert arguments to another language in a language independent manner. The technique also accommodates new releases with increased flexibility. Prolog actually becomes language independent because the variations for individual languages are placed in the data structures.

No modification to user programs is necessary when a new release of a language becomes available. Changes are only required in the associated tables. Thus, source code modifications are minimized. Also, generalization of the descriptor table's design supports all data formats, arrays and structures.

General Background

For Prolog, an external extension is a separately compiled program module. It is recognizable as a Prolog external extension because it contains an external extension header. The header serves as an identifier for an external predicate set type of external extension. Every external predicate or external computable expression is described in turn with its name, arity, and in the case of an external extension in another language, with its expected arguments.

Whereas external extensions written in assembler may directly process Prolog data structures, external extensions written in another language must receive their data in the appropriate form for the particular language. This requirement implies that the interface to the languages external extensions must convert Prolog data structures into a form suitable for processing by the compiled external extensions. Further, the interface must convert back to Prolog the results returned by the external extensions.

A language external predicate or external computable expression is a subprogram. In Cobol this implies an entry, in Fortran a subroutine or function, in PL/1 a procedure and a function in C. The parameters expected by the subprogram are declared in name, and type in other language statements that open the subprogram in the external extension source files.

As part of a general external predicate or external computable expression external extension header, PRODECE macro instructions describe every external extension-external computable expression in turn. If the external extension is described as a language type external extension, then the ARGS=Descriptor_Label in the PRODECE macro points to the PROARGS macro instruction of the particular external predicate or external computable expression.

Description Of The PROARGS Macro

The PROARGS macro instruction has the following format

```
┌────── PROARGS FORMAT ────────────── ┐
│Label PROARGS Descriptor_1.Descriptor_2 ...│
└────── End of PROARGS Format ────────── ┘
``` where every descriptor describes in turn one parameter of the language subprogram, or, in the case of the C programming language, nesting and fields in structs. One descriptor may have one of the four following formats:

1) (C only) Open a level of C struct;
2) (C only) Close a level of C struct;
3) (DATA_TYPE IO_TYPE) Describe one scalar parameter or (C only) one scalar field of a struct,
4) (DATA_TYPE IO_TYPE DIMENSIONS) Describe one array parameter or (C only) one array field of a struct.

Data_Type specifies the possible conversion target types. It belongs to the standard/XA data types. FIG. 16 shows the correspondence between Data_Type 900 and the standard data types of 370/XA Assembler 905, C 910, Cobol 915, Fortran 920, and PL/1 925.

IO_Type specifies whether the argument is an input to or result from the language subprogram. When used in a C struct, all IO_Type of the struct must take the same value. IO_Type may take the following values:

I  Member of the Parameter list, Input to the subprogram. In C, argument passed by pointer—to be used as a * parameter.

O  Member of the Parameter list, Result of the subprogram. In C, argument passed by pointer—to be used as a * parameter.

IO  Member of the Parameter list, Input to the subprogram, modified by the subprogram, and the result of the subprogram. In C, argument passed by pointer—to be used as a * parameter.

R  Register return argument (Fortran functions, PL/1 procedure . . . RETURNS( . . . ), and C functions). Result of the subprogram. In C, argument returned by value—not to be used as a * parameter.

V  (C only) Member of the Parameter list. Input to the subprogram, argument passed by value—not to be used as a * parameter.

A  (C only) Register return argument (C functions). Result of the subprogram returned by pointer—to be used as a * parameter. The subprogram, argument passed by value—not to be used as a * parameter.

Finally, dimensions, if specified, indicate that the argument or C struct field, is an array. Dimensions may be one or more of N that describe the exact dimension of the array, or ARGN (Refer Dimension) that specifies that another Descriptor—the one of rank n in the increasing sequence of argument/struct fields is to contain the actual dimension.

Referring to FIG. 17, a C subprogram is presented for an example of the inventive interface. FIG. 18 presents the Prolog Proargs interface information for the C subprogram. In FIG. 17, Uc 950 is input, Sl 955 is input, Dv 957 is input, Dp 959 is input and output, where Cp 961 is input, Fa 963 is output, Ip 965 is input and output, and where Sl 955 contains the actual dimension of the array Ip 965. The corresponding PROARGS macro instruction is illustrated in FIG. 18.

Argument Descriptor Format

The PROARGS macro instruction is translated into a set of binary descriptors that the Prolog language interface uses to convert the Prolog data to another language format. The interface is a general interpreter of these binary descriptors.

The binary descriptor format is shown in FIG. 19. The conversion processes are descriptor driven, and take six steps to complete.

Step One

Copy into Read-Write storage of the descriptors;
Relocate the "FORCDIM1" Refer fields;
Setup the "FORFDIM, FORFDEF" flags;
Setup the "FORDAL2, FORDAL4, FORDAL8" flags, according to the field alignment rules of C;
Computation of the arity "FORDSKE" for every level of C struct nesting, to the fields alignment rules of C,
Check the arity of the external predicate or external computable expression.

STEP Two

Conversion of every I/IO/V argument.

STEP 3

Storage Allocation for every O argument.

STEP 4

If there are V arguments, copy the Parameter list and the V arguments together.

STEP 5

Actual language call

STEP 6

Conversion back of every IO/O/R/A argument.

The interface between Prolog and other languages relies extensively on the information provided by the PROARGS macro to build the data in the formats expected by the compiled program. This format is rich enough, and the conversion routines powerful enough to handle all known types of data (binary, floating point, character); any number of array dimensions and any array dimension; dimensions that are fixed once and for all or dimensions that the compiled program expects in another argument, parameter passing as by value, by address, or by register, parameters passed as input, or returned as output or both, any kind of C structure, including nested struct, along with the automatic alignment checking.

Details of the Interface

The Prolog system of the subject invention provides a general interface to routines written in a compiled language. One of the values of this interface is to subsidize Prolog's shortcoming in support for intensive computation. A programmer can reserve the numerically intensive parts of an application for implementation in a more suitable language. The interface allows a Prolog application to employ Fortran subroutines or functions, PL/1 Non-MAIN Procedures, and similar facilities in other languages as deterministic Prolog predicates or as Prolog expressions. The Prolog interface also manages the operating system dependent portions of a compiled program, and converts Prolog data types towards and from their equivalents in the compiled languages.

Fortran Example

A basic VS/FORTRAN example is provided in Z1FORT1 FORTRAN. A similar capability is provided for other programming languages such as COBOL, PLI, PASCAL, C, and Assembler. The differences between the interfaces for the other languages are discussed in a separate section.

Organization Of An External Predicate

1. Write one or more Function/Subroutine in a compiled language. For example, the sources could be placed in MYFORT1 FORTRAN. It is useful to gather into the same source file all Subroutines and Functions that are used by a Prolog program, to optimize the time devoted to environmental setup. Further, the FORTRAN and COBOL languages allow only a single active program at any time. This restriction does not apply to "Block Structure Compiled Languages" like PASCAL or PL/1.

2. Add the information shown in FIG. 20 following the Main program statement in the source code. In other languages, name the main program Z1MAIN, and let the main program only call Z1COMH without arguments. These names are fixed.

NOTE: The main program must contain any global declarations and initialization. In FORTRAN, this implies declaration and initialization of the COMMON areas. This processing must take place before the call to Z1COMH. Global cleanup, if needed, must also take place in the main program, after the call to Z1COMH.

3. Prepare an ASSEMBLE descriptor file named MYFORT0 ASSEMBLE, according to the instructions of the next chapter.

4. Compile the FORTRAN source file, generating MYFORT1 TEXT.

5. Assemble the ASSEMBLE descriptor file with MACLIB: Prolog, which generating MYFORT0 TEXT.

6. Concatenate as one TEXT file, say MYFORT TEXT, the following three files in order.
  a. A TEXT file obtained from the compiled descriptor file (MYFORT0 TEXT);
  b. A Z1COMP1 TEXT file provided by Prolog; and
  c. A TEXT file generated by compiling the FORTRAN source file, (MYFORT1 TEXT).

7. Provide linkage to a GLOBAL TXTLIB to the compiled language libraries (for VS/FORTRAN V2, it is named VSF2FORT TXTLIB).

8. LOAD the concatenated TEXT file with options NOAUTO CLEAR RLDSAVE.

9. GENMOD the concatenated Text file.

10. Add an entry into the file Prolog NAMES, of the form:

```
 --FORTRAN NICKNAME IN Prolog NAMES ------
:nick.MYFORT
:type.PREXTERN
:file.MYFORT MODULE A
 --END FORTRAN NICKNAME IN Prolog NAMES-
```

11. Do not forget to keep a GLOBAL LOADLIB or GLOBAL TXTLIB, if it is necessary for the compiled language (GLOBAL LOADLIB VSF2LOAD in VS/FORTRAN V2).

12. Use the predicates and expressions as indicated below.

13. Upon completion of execution, expect some log of the errors caught by the compiled language.

Parameter Passing

The Prolog interface is designed to accommodate the majority of data types used by the various programming languages. Thus, all data types that FORTRAN recognizes, can be exchanged in both directions between Prolog and Fortran.

No restrictions are placed on the type of instructions that the FORTRAN program may perform. This means that COMMON management, File or Terminal IOs, FORTRAN recovered errors, . . . , are all allowed. However, the Fortran program can only access the data areas assigned to Fortran. Thus, access to the Prolog areas directly from the Fortran application is not permitted except via the call interface.

Example Code

Some examples are provided in FIGS. 21, 22, and 23. FIG. 21 illustrates the source code for the function called STUPID. The function STUPID is used to test the interface and the FORTRAN Error Recovery. FIG. 22 illustrates the declaration of the STUPID function with a source listing of Z1FORT0 ASSEMBLE. FIG. 23 illustrates the information displayed when the STUPID is called during a Prolog program execution.

To declare arrays, place the dimension information in the descriptor of the argument in addition to its type and IO control. For each dimension of the array, place a number, if that dimension is fixed, or a reference like ARGn where n is a positive integer, describing the position of the Fortran argument containing the dimension.

The following rules govern array definition. If the dimension is a reference, the corresponding argument type must be Integer on 4 bytes (I4). An array is converted from a Prolog list, a bi-dimensional array is converted from a Prolog list of lists. If the array has IO Control I or IO, then the interface is able to computer the dimensions of the array from the Prolog list. Thus, the Fortran arguments that contain the dimensions are built by the interface and cannot appear in the predicate. If the array has IO Control O or R, then the interface must allocate the storage for the result array, and the Fortran arguments that contain the dimensions are built by the interface and must appear in the predicated.

The descriptors of the dimensions are placed left to right in row major order—the standard way to sweep a multi-dimensional array. Thus, the C, FORTRAN, PASCAL, PL/1 and COBOL interfaces the dimensions appear in the program in the reverse order as compared to the Prolog description as depicted in FIG. 24.

Sample Generic Declarations

Instead of using a predicate name for each FORTRAN Subroutine and Function, the Prolog application only uses one predicate, for all calls to FORTRAN. This is called the GENERIC format. To use it, there must exist special PRODECE macros inside the ASSEMBLE descriptor file. Say for example, that the Prolog application would like wants to employ all FORTRAN Subroutines and Functions via one predicate name, and one expression. The descriptor file then contains the information shown in FIG. 25.

To use the generic descriptor files, the application uses the interface:

goals ext_pred(pred_generic(* . . . ), myfort, pgeneric); and ext_func(func_generic(* . . . ),myfort,f-generic).

Then, where a goal like

←*:=my_stupide(2)

is used, it is replaced by

←*:=func_generic(stupide,2). . .

Further, where

←test-tabl([100,101,102,103],[[200,201],[300,301],[400,40-1]],['Chaine1', 'Chaine2'])

is used, it may be replaced by

←pred_generic(test-tabl,[100,101,102,103,],[[200,201],[300,301],[400,40-1]], ['Chaine1','Chaine2']). . .

The generic predicates and expressions use an extra first argument, that defines the Subroutine or Function that the application employs. It contains an atom or a character string that is compared with the NAME fields of the PRODECE macros of the external Module where the Generic PRODECE appears.

Compiled Predicate v. Functional

There is not a one-to-one relationship that enforces a FORTRAN subroutine to be used as a predicate, and a FORTRAN function to be used as an expression. Indeed, both a subroutine and a function may be used as Prolog predicates. The only difference is in the PROARGS declaration, where a function will use the IO Control R, and the declaration must appear first in the PROARGS list. When the function is used as a Prolog predicate, the result returned by the function will be unified with the first argument of the predicate. In that sense, a predicate invoking a function uses one argument more than what the function expects, to receive the result. In the same logic, both a subroutine and function may be used as expressions, provided they obey the following rules.

1. One argument is either declared with IO Control O, IO, R (for function only), to provide the result of the expression.
2. All other arguments are declared with IO Control I. The differences between complied predicates and complied expressions include the following list.
   a. Compiled predicates receive their arguments simply converted from Prolog, whereas complied expressions receive their arguments evaluated, then converted from Prolog.
   b. Management of the Global Stack with compiled expressions is more economical than compiled predicates, which means that a global stack overflow is less likely to occur.

As an example of point one above, one writes expressions as shown in FIG. 26. The examples show the use of compiled expressions like 0+0, which demonstrates the automatic internal evaluation of the arguments of the expression.

Differences

COBOL

1. Main program must be a separate Procedure Division;
2. Subroutines must be gathered in one Procedure Division, where every subroutine uses a separate ENTRY statement. Have a look to Z1COBOL1 COBOL; and
3. No conversion is possible to data types using the Decimal Format, (PACKED or ZONED). In Cobol, this implies that non-BINARY integer types.

PASCAL

1. No conversion is possible to Pascal structures, or pointers; and
2. Due to the organization of the data, parameter passing in Pascal forces a COPY of the Plist in the Pascal Stack. This is done in Z1PASC0 ASSEMBLE from line 52 on.

PL/1

1. No conversion is possible to PL/1 Structures, or Pointers;
2. Because PL/1 expects Descriptors instead of arguments in the Plist for aggregates. Thus, all aggregates must be declares as BIN FIXED(31) with the BASED attribute and the ADDR Builtin.

Prolog TO C

Prolog provides a powerful interface to the C programming language. Everything described previously in the interface information is equally applicable to the C interface. An example of a C interface is provided in Z1C1 C illustrated in FIG. 27.

Organization of C

1. Write one or more C functions into a C source file, for example MYC1 C;
2. In that same source file, add the #INCLUDE declaration shown in FIG. 28;
3. Add into that same source file the MAIN function of the C code as shown in FIG. 29. It must contain the call Prolog_INIT. Before the Prolog_INIT, you may add C code that initialize the global data of the C code.

After the Prolog_INIT, you may add the global cleanup code;

4. Prepare an ASSEMBLE descriptor file named MYC0 ASSEMBLE, according to the instructions that follow;
5. Compile the C source file, with compiler option RENT, which produces MYC1 TEXT;
6. Assemble the ASSEMBLE descriptor file with MACLIB: Prolog, which generates MYC1 TEXT;
7. Build One TEXT file as illustrated in FIG. 30, say MYC TEXT, with the CPLINK utility of the C Compiler, out of the following four in that order;
   a. The TEXT file obtained from the ASSEMBLE descriptor file (MYC0 TEXT);
   b. The Z1COMP1 TEXT file provided by Prolog;
   c. The Z1COMP2 TEXT file provided by Prolog; and
   d. The TEXT file obtained from the C source file, (MYC1 TEXT);
8. Assign a GLOBAL TXTLIB to the C language libraries, LIB and CBASE;
9. LOAD the CPLINK produced TEXT file with options NOAUTO CLEAR RLDSAVE;
10. GENMOD the program;
11. Add an entry into the file Prolog NAMES, of the form:

```
┌---C NICKNAME IN Prolog NAMES-----------┐
:nick.MYC
:type.PREXTERN
:fileC MODULE A
└---END OF C NICKNAME IN Prolog NAMES--┘
```

12. Link GLOBAL LOADLIB CLINK, and the GLOBAL TXTLIB CBASE during the C code execution;
13. Use an EXEC DLIB LOAD before using any C code. Use an EXEC DLIB UNLOAD when C and Prolog have completed;
14. Use the predicates and expressions as indicated below; and
15. Upon execution of the function call by←fin., expect some log of the errors caught by the compiled language.

Parameter Passing and Declarations

The Fortran sample for the function Stupid shown in FIG. 21, is translated into C and shown in FIG. 31. Note that arguments IO Control I, O or IO are received by C as pointers, this explains that TSI in that example is always used with the C * dereferencing operator.

An execution of the C Stupid function gives the information displayed in FIG. 32.

Support Functions For C

For external predicates only, the interface provides support functions that may be classified in three areas:
1. Storage Management;
2. Control of Backtracking and/or Error handling; and
3. Analysis of Prolog Data Objects.

STORAGE MANAGEMENT

The interface provides access to the COMAREA as defined by the PROINI macro. Also, it provides a special data type A, which locates a working storage area that is kept across backtracks.

Prolog_GET_COMAREA()

This function returns a pointer to the COMAREA that was permanently allocated as part of the storage loading of the external extension. This COMAREA is zeroed by the interface at loading time, and never modified thereafter. It is freely used by the C code and common to all C functions of the external extension.

PROARGS ... (AN,I) ...

The interface allocates on demand a working storage area, for use by a C function. The storage area is described in the PROARGS macro, by the data type A, with data length n user defined (say for example (A25-6,I) for a 256 bytes working area), and IO Control I. The corresponding C function may receive this argument with a char * parameter.

The working storage area is for exclusive use of the particular C function that defines it in the PROARGS macro. It is zeroed when the C function is normally called, and preserved across backtrack calls of that same function. It may be used to keep data across backtrack calls of a C function.

Backtracking/Error Management

A C function is defined to Prolog by default as a deterministic predicate. The C function call may change that behavior, with some functions provided by the interface. A first set is used to determine return processing characteristics. This information is used by Prolog to determine if the C function shall succeed, fail or make an error when it returns to the interface.

Prolog_SET_SUCCESS()

This function reverts to the normal Success state. Thus, Prolog execution proceeds normally after the C return statement of the C function.

Prolog_SET_BACK()

This function causes Prolog execution to Fail immediately after the C return statement of the C function.

Prolog_SET_ERROR(ERROR_CODE)

This function causes Prolog execution to stop with an Error of type Error_Code, after the C return statement of the C function. Some predefined Error_Codes are provided by the Prolog.H include file.
Prolog_ERR_GLOBAL Global Stack Overflow
Prolog_ERR_LOCAL Local Stack Overflow
Prolog_ERR_TRAIL Trail Stack Overflow
Prolog_ERR_SYNTAX Syntax Error
Also, some of the support function that analyze Prolog Objects set the Error_Codes previously discussed.

Prolog_TEST_ERROR()

This function determines whether there is an Error_Code set. It returns a non-zero value equal to the error code if an Error_Code is detected.

A second set is used to decide whether the C function may be called again in the future as part of the backtracking process. We say that the C function has created a choice point. Note that the decision whether the function creates a choice point is independent, of its return status (success, failure or error) as managed by the first set of support functions. However if a function fails and has created a choice point, it will be recalled immediately because that choice point is the most recent.

Prolog_RESET_CHOICE ()

This function reverts to the normal no-choice point state.

Prolog_SET_CHOICE()

This function creates an active choice point. If backtracking occurs, then the C function is called again with the same arguments.

Prolog_TEST_CHOICE()

This function determines whether the C function was called normally or as part of the backtracking process. It returns a non-zero value if the latter is true. When a C function is called, normally or as part of the backtracking process, it has no active choice point any more. If the function called by the backtrack is recursive, it must recreate a choice point.

Analysis of Prolog Data Objects

This set of functions describes a Prolog object, selects sub-objects inside a Prolog object, translates Prolog objects into C and C variables into Prolog objects, and unifies a plurality of Prolog objects.

Prolog_TYPE(Prolog_OBJECT)

This function returns the type of a Prolog_OBJECT. The complete list of Prolog types as understood by Prolog_TYPE returns a value associated with Prolog_TYP_OTHER. An unknown type, returns a value associated with Prolog_TYP_VARIABLE. A normal Prolog variable, returns a value associated with Prolog_TYP_NIL. The NIL atom returns a value associated with Prolog_TYP_ATOM. An atom other than NIL returns a value associated with Prolog_TYP_STRING. A character string, returns a value associated with Prolog_TYP_INT. A floating point number returns a value associated with Prolog_TYP_LONGINT. A rational number returns a value associated with Prolog_TYP_RATIONAL. A skeleton returns a value associated with Prolog_TYP_SKELETON. An extended skeleton returns a value associated with Prolog_TYP_EXTENDEDSKELETON. A list pair returns a value associated with Prolog_TYP_LIST.

Prolog_FUNCTOR(Prolog_OBJECT)

This function returns a Functor of a Prolog_Object in Prolog_Object format.
If the Object is of type Prolog_TYP_SKELETON or of type Prolog_TYP_EXTENDEDSKELETON, the function returns the Term Functor.
If the Object is of type Prolog_TYP_LIST, the function returns the atom "."
If the Object is the NULL pointer, the function returns the Functor of the external predicate that was used to call the C function.
Else the function sets the Error_Code to Prolog_ERR_SYNTAX, and returns the NULL pointer.

Prolog_ARITY(Prolog_OBJECT)

This function returns the arity of a Prolog_Object, in C int format.
If the Object is of type Prolog_TYP_SKELETON or of type Prolog_TYP_EXTENDEDSKELETON, the function returns the Term's Arity.
If the Object is of type Prolog_TYP_LIST, the function returns the number two.

If the Object is the NULL pointer, the function returns the Arity of the external predicate that was used to call the C function.

Else the function sets the Error_Code to Prolog_ERR_SYNTAX, and returns a −1 value.

Prolog_PREFIX(Prolog_OBJECT)

This function returns the prefix of a Prolog_Object in Prolog_Object format.

If the Object is the NULL pointer, it returns the Prefix of the external predicate that was used to call the C function.

Else the function sets the Error_Code to Prolog_ERR_SYNTAX, and returns the NULL pointer.

Prolog_ARG(Prolog_OBJECT,RANK)

This function returns the Rankth subobject of a Prolog_Object, in Prolog_Object format. The first subobject has Rank 0.

If the Object is of type Prolog_TYP_SKELETON or of type Prolog_TYP_EXTENDEDSKELETON, it returns the Rankth subobject.

If the Object is of type Prolog_TYP_LIST and Rank is either 0 or 1, the function returns the Rankth subobject.

Else the function sets the Error_Code to Prolog_ERR_SYNTAX, and returns the NULL pointer.

Prolog_LIST(Prolog_OBJECT,RANK,SELECTION)

This function returns the Rankth element of a List Prolog_Object, in Prolog_Object format. The first element has Rank 0.

If the Object is of type Prolog_TYP_LIST and Selection is Prolog_LST_VALUE, the function returns the Rankth element of the List.

If the Object is of type Prolog_TYP_LIST and Selection is Prolog_LST_NEXT, the function returns the Rank+1th List pair.

If the Object is of type Prolog_TYP_LIST and Selection is Prolog_LST_CURRENT, the function returns the Rankth List pair.

Else the function sets the Error_Code to Prolog_ERR_SYNTAX, and returns the NULL pointer.

Prolog_LIST_LENGTH(Prolog_OBJECT)

This function counts and returns the number of list pairs that are chained to form a list. The count is zero if the Prolog_Object is not a list pair. The count concludes whenever the function is presented with a non list pair as the second field of a list pair (the terminating nil of a normal List, or any other Prolog type except list pair).

Prolog_COMP_FLOAT(FLOATING_POINT, FLOATING_POINT)

This function returns a non zero value, if the two floating point numbers in C double format are closer together than the current Prolog fuzz value.

Prolog_CONSTANT(RANK)

This function returns the Rankth Constant Object defined in the set of PROCONS macros. The first Constant Object has Rank 0. If the Constant is a PROCONS LIST or a PROCONS SKEL, a new List pair filled with Prolog variables or a new Prolog Term with the right Functor and Arity and Prolog variables as arguments, is allocated into the Global Stack.

This function also provides the Constant Objects with predefined values of Rank:

Prolog_CST_NIL The special Prolog atom nil,

Prolog_CST_LIST A newly allocated list pair, with variable arguments,

Prolog_CST_EMPTY empty Prolog character string.

If the Global Stack overflows, it sets the Error_Code to Prolog_ERR_GLOBAL, and returns the NULL pointer.

Prolog_CONVERT_INT(Prolog_OBJECT)

This function converts the Object into C integer format, and returns the integer.

If the Object is of type Prolog_TYP_INT it returns the integer format value of the Object.

Else the function sets the Error_Code to Prolog_ERR_SYNTAX, and returns a zero value.

Prolog_CONVERT_FLOAT(Prolog_OBJECT)

This function converts the object into C double format, and returns that double.

If the Object is of type Prolog_TYP_FLOAT it returns the double format value of the Object.

If the Object is of type Prolog_TYP_LONGINT or Prolog_TYP_RATIONAL, it returns the double format converted value of the Object.

Else it sets the Error_Code to Prolog_ERR_SYNTAX, and returns a zero value.

Prolog_CONVERT_STRING(Prolog_OBJECT)

This function converts the object into C char * format, and returns that char *.

If the Object is of type Prolog_TYP_STRING, the function returns the char * format converted value of the Object.

If the Object is of type Prolog_TYP_ATOM or Prolog_TYP_NIL, it returns the char * format converted value of the Print-Name of the Object.

If the Local Stack overflows, it sets the Error_Code to Prolog_ERR_LOCAL, and returns the NULL pointer.

Else it sets the Error_Code to Prolog_ERR_SYNTAX, and returns a NULL pointer.

Prolog_CONVERT_Prolog(TYPE_ORG,- Prolog_OBJECT OR C OBJECT,TYPE_DEST)

This function converts the Object into Prolog_Object of type Type_Dest and returns the converted Prolog_Object. Type_Org is the Prolog_Type of the Prolog_Object or may be specified as Prolog_TYP_OTHER. However, if the Object is a C object, Type_Org must be specified and must belong to the following set.

Prolog_TYP_BINARYSTRING A character string in C char * format,

Prolog_TYP_BINARYINT An integer number in C int format, and

Prolog_TYP_BINARYFLOAT A floating point number in C double format.

The supported conversions are listed below.

Prolog_TYP_BINARYSTRING to Prolog_TYP_STRING,

Prolog_TYP_BINARYSTRING to Prolog_TYP_ATOM,

Prolog_TYP_BINARYSTRING to Prolog_TYP_NIL,

Prolog_TYP_STRING to Prolog_TYP_STRING,

Prolog_TYP_STRING to Prolog_TYP_ATOM,

Prolog_TYP_STRING to Prolog_TYP_NIL,

Prolog_TYP_ATOM to Prolog_TYP_ATOM,
Prolog_TYP_ATOM to Prolog_TYP_STRING,
Prolog_TYP_NIL to Prolog_TYP_NIL,
Prolog_TYP_NIL to Prolog_TYP_STRING,
Prolog_TYP_INT to Prolog_TYP_INT,
Prolog_TYP_BINARYINT to Prolog_TYP_INT,
Prolog_TYP_FLOAT to Prolog_TYP_FLOAT, and
Prolog_TYP_BINARYFLOAT to Prolog_TYP_FLOAT.

If the Global Stack overflows, the function sets the Error_Code to Prolog_ERR_GLOBAL, and returns the NULL pointer. Else the function sets the Error_Code to Prolog_ERR_SYNTAX, and returns a NULL pointer.

Prolog_UNIFY(Prolog_OBJECT,Prolog_OBJECT)

This function unifies the two Objects. If it succeeds, it returns the unified version or the first Prolog_Object. If it fails, backtracking takes place. For performance reasons, Prolog simple non-frozen variables, Prolog integers, atoms, and strings are handled dynamically. However, other types can cause a context switch from C to Prolog, and invoke the full Prolog unifier, before a context switch back to C.

If the Trail Stack overflows, the function sets the Error_Code to Prolog_ERR_TRAIL, and returns the NULL pointer.

Existing Applications

For existing applications that require communication to Prolog, there is also an interface from such applications to Prolog. As seen from FORTRAN, the interface is a TEXT file, Z1COMPF TEXT shown in FIG. 33. The interface provides an "INTEGER function" named Prolog. The INTEGER result is the Return Code of the request.

```
┌-----FORTRAN CALL FORMAT SAMPLE----------- ┐
C--We declare the external Function
   INTEGER Prolog
C--We reserve space for the Return Code
   INTEGER RETCODE
C--We use a sample Call to show the Format
   RETCODE = Prolog('START','Prolog',           C
   'PrologWS','REUSE',")
└--END OF FORTRAN CALL FORMAT SAMPLE--┘
```

NOTE: Because Fortran does not support empty character strings, one has to replace empty character strings with strings of one space character.

C Interface to Prolog

The C interface is illustrated in a TEXT file named Z1COMPC TEXT shown in FIG. 33. This interface provides an "int function" called Prolog. The int result is the Return Code of the request.

```
┌--C CALL FORMAT SAMPLE-------------------- ┐
/*--Declare the external Function--------*/
    #include <Prolog.H>
/*--Reserve space for the Return Code-----*/
    int Recode;
/*--Use a sample Call to show the Format--*/
    Retcode = Prolog("START",*
    "Prolog","PrologWS",
    "REUSE","");
└--END OF C CALL FORMAT SAMPLE-------- ┘
```

COBOL

The interface from Cobol to Prolog is illustrated in the source listing for Z1COMPB TEXT shown in FIG. 35. The return code of the request, is returned as the first argument of the CALL "Prolog" statement. Also, where C and Fortran may use character strings, COBOL has to supply the length of the character string along with the character string itself.

```
┌--COBOL CALL FORMAT SAMPLE-------------- ┐
* We Reserve space for all arguments
  01 RETCODE PIC S9(09)BINARY.
  01 START-STRCT.
  05 START-LGTH PIC 9
         (04)BINARY VALUE 5.
  05     START-STR PIC X
         (05)VALUE "START".
  01 Prolog-STRCT.
  05 Prolog-LGTH PIC 9
         (04)BINARY VLAUE 5.
  05 Prolog-STR PIC X
         (05)VALUE"Prolog".
  01 PrologWS-STRCT.
  05 Prolog-LGTH PIC 9
         (04)BINARY VALUE 7.
  05 Prolog-STR PIC X
         (07)VALUE"PrologWS".
  01 REUSE-STRCT.
  05 REUSE-LGTH PIC 9
         (04)BINARY VALUE 5.
  05 REUSE-STR PIC X
         (05)VALUE "REUSE".
  01     OPTION-STRCT.
  05 OPTION-LGTH PIC 9
         (04)BINARY VALUE 0.
*Sample Call to Show the Format
  CALL "Prolog"USING RETCODE, START-STRCT,
  Prolog-STRCT,PrologWS-STRCT,REUSE-STRCT,
  OPTION-STRCT.
.
└--END OF COBOL CALL FORMAT SAMPLE-- ┘
```

The concluding discussion uses C syntax as a communication medium.

The language interface to Prolog provides four basic commands:

START Initialize Prolog, and if not already loaded, loads a new workspace in a new session, and activates the workspace initial goal.

STOP Completes a Prolog session, and frees the associated storage.

CALL Runs a Prolog predicate with data converted from the calling program, and if the predicate succeeds, converts results back to the calling program, RECALL Requests the next solution of the latest CALL command, and if the predicate succeeds, converts results back from the calling program into the data supplied by the original CALL command.

START COMMAND

The command START requires 5 arguments, all character strings. The syntax is provided below.

```
┌--C INTERFACE START COMMAND--------------- ┐
   Retcode = Prolog("START",Token,Workspace,Share,
     Options);
└--END OF C INTERFACE START COMMAND---┘
``` where TOKEN is a session token of eight characters or less, that is used to identify the Prolog session where the program submits the CALL, RECALL and STOP commands.

WORKSPACE is a workspace name of eight characters or less, identifying an existing file of filetype Prolog WS. If the application is the original initial workspace supplied by Prolog, use the name Prolog WS.

SHARE is a selection string of 8 characters or less, that must take the value NEW or REUSE. If the string is empty, the default (NEW) is taken.

OPTIONS is a character string that contains options to be supplied to the LProlog EXEC by the START command.

If the NEW Share selection is in use, the START command STOPs any Session with the Session name Token. Then START issues a CMS command of the form LProlog NAME Token WS Workspace Options. During the processing of the LProlog EXEC, Prolog is initialized. If not already done, then the command builds a session of name token with a workspace read from the Prolog WS, with any options that may be required.

The START command returns the return code of the LProlog command as its own return code, or a Prolog error code indicating the command syntax was invalid, or a Prolog external storage failure if the Storage allocation request necessary to build the LProlog command failed.

STOP

The command STOP requires two character arguments. The syntax is

```
┌─────C INTERFACE STOP COMMAND──────────┐
  Retcode = Prolog("STOP", Token):
└─────END OF C INTERFACE STOP COMMAND───┘
``` where TOKEN is the Session Token of eight characters or less, that identifies the Prolog session at the START command.

The STOP command issues a CMS command of the form NUCXDROP Token. Then, during the processing of the NUCXDROP command, the session of name token is finished and its storage reclaimed. If there is no more any Prolog active session, the Prolog itself is removed from the memory.

The STOP command returns the return code of the NUCXDROP command as its own return code, or a Prolog Syntax Error if the command was invalid.

CALL Command

The command CALL requires at least five character arguments, the first five being character strings. The syntax is illustrated below.

```
┌──C INTERFACE CALL COMMAND──────────┐
  Retcode = Prolog("CALL", Token, Prefix, predicate.
  Descriptor, Arguments . . .);
└──END OF C INTERFACE CALL COMMAND───┘
``` where TOKEN is the eight character Session Token that uniquely identifies the Prolog session at the START command.

PREFIX is the Prefix of the predicate that is called. If supplied as an empty string, the predicate is not given a prefix. In that case, the priority predicate of the predicate name is called, predicate is the Name of the predicate that is to be called, a character string, case sensitive.

DESCRIPTOR is the Descriptor character string of the conversion of the input and output arguments. It may be empty, in the case of the zero-arity predicate, and in that case, there must be no Arguments behind the Descriptor in the Prolog call.

ARGUMENTS are zero or more data arguments that must be converted into Prolog Data Structures before invoking the predicate, and must be passed as arguments of that predicate.

For results arguments, the predicate receives variables in the corresponding positions and if the predicate succeeds, the Prolog data that has been put into these variables is converted back to the format of the calling program.

The CALL command runs the Prolog predicate or Prefix:predicate with input arguments converted from the calling program, and output arguments supplied as variables. If a Prolog Error is encountered, then the CALL command returns the Error Code as a Return Code. If the predicate fails, then the CALL command returns its own return code.

If the predicate succeeds, then the CALL command converts back the output arguments from the Prolog data unified with the variables, and returns zero as its return code.

If the CALL command is invalid, it returns a Prolog Syntax Error as its own return code.

RECALL Command

The command RECALL requires two character arguments. The syntax is shown below:

```
┌──C INTERFACE RECALL COMMAND────────┐
  Retcode = Prolog("RECALL", Token);
└──────C INTERFACE RECALL COMMAND────┘
``` where TOKEN is the eight character session identifier. The RECALL command requests the Next solution from the latest CALL command. It returns the same Return Codes as the CALL command. It returns the results of the solution if the predicate succeeds another time, into the output arguments supplied by the CALL command.

Call Descriptor

Descriptor is a character string of zero or more arguments. It uses a subset of the PROARGS syntax. The following cases of the PROARGS syntax may not be used in the CALL Descriptor:
Data Types O4, AN, and
IO Controls V, R, A.

Also, IO Controls Input and Output are relative to the called Prolog predicate, not to the called compiled language external predicate. Two formats (Normal Descriptor and C struct Descriptor) of the PROARGS macro are valid.

Data Types B1, B2, B4, I1, I2, I4, E4, E8, J4, J8, CN, C0, I, O, IO; and
Dimension Descriptors N, ARGN.

When a Dimension is described as an ARGN then the N corresponding argument must be Data Type I4, must be IO Control I, and must be supplied with is correct value as a program data. The predicate receives both the Array in a form of a List; or a List of Lists, for multi-dimensioned arrays, and the dimensions as scalar numbers. The dimension numbers are passed to the predicate; whereas, in the Prolog to compiled language interface, the calling Prolog predicate does not have to supply them for Input Arrays. In the compiled language to Prolog interface, the dimension numbers are given to the predicate, whether the Arrays are input and then provided as lists, or are output and provided as variables.

The predicate is required to construct output arrays of exactly the size supplied by the dimension numbers. If it does not, the back conversion fails with an error.

From Prolog to External Process

Figure 36A:
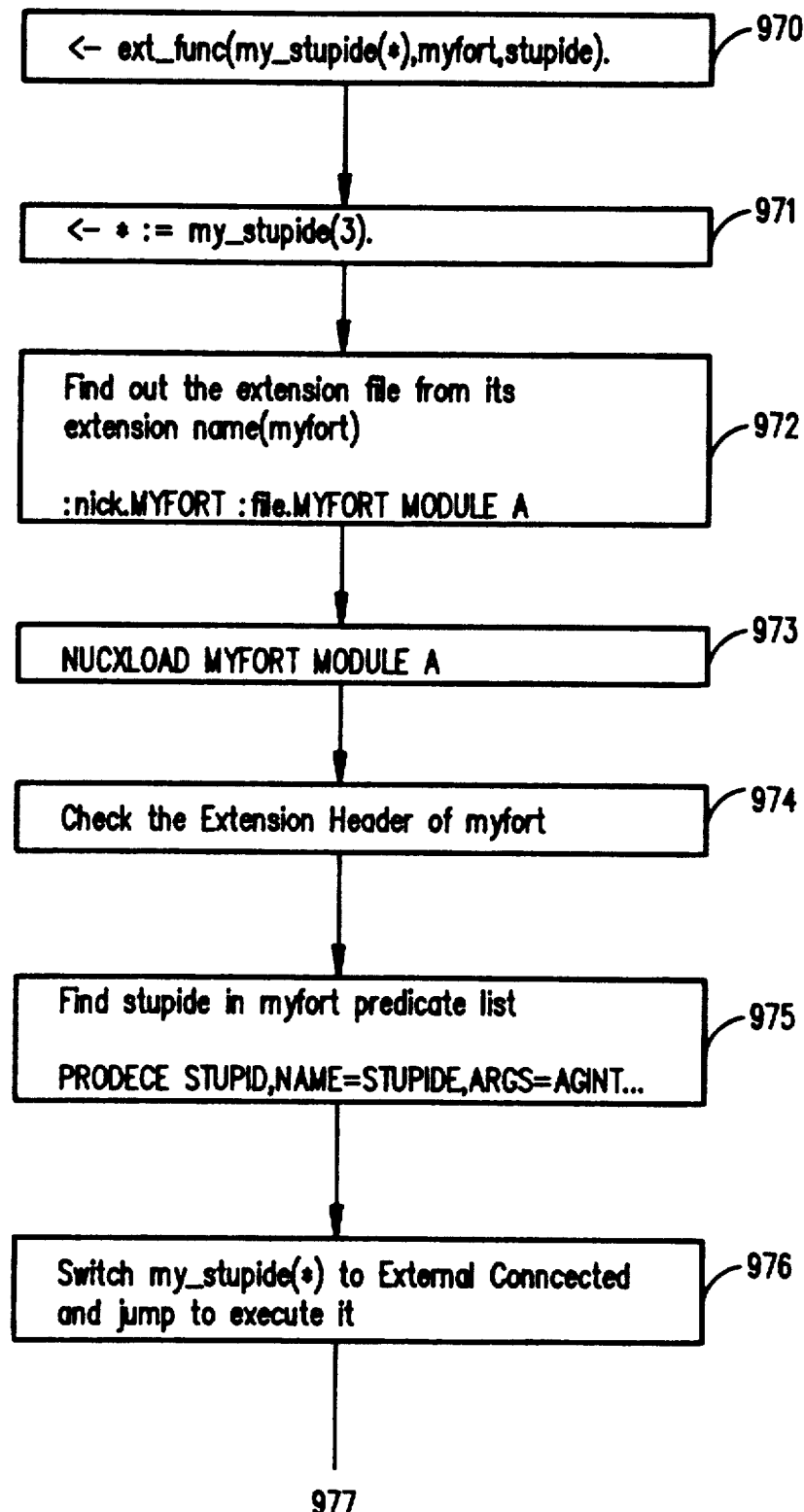
FIGS. 36A-36C are a flowchart showing the logic of the Prolog communication to external processes in accordance with the subject invention.
Figure 36B:
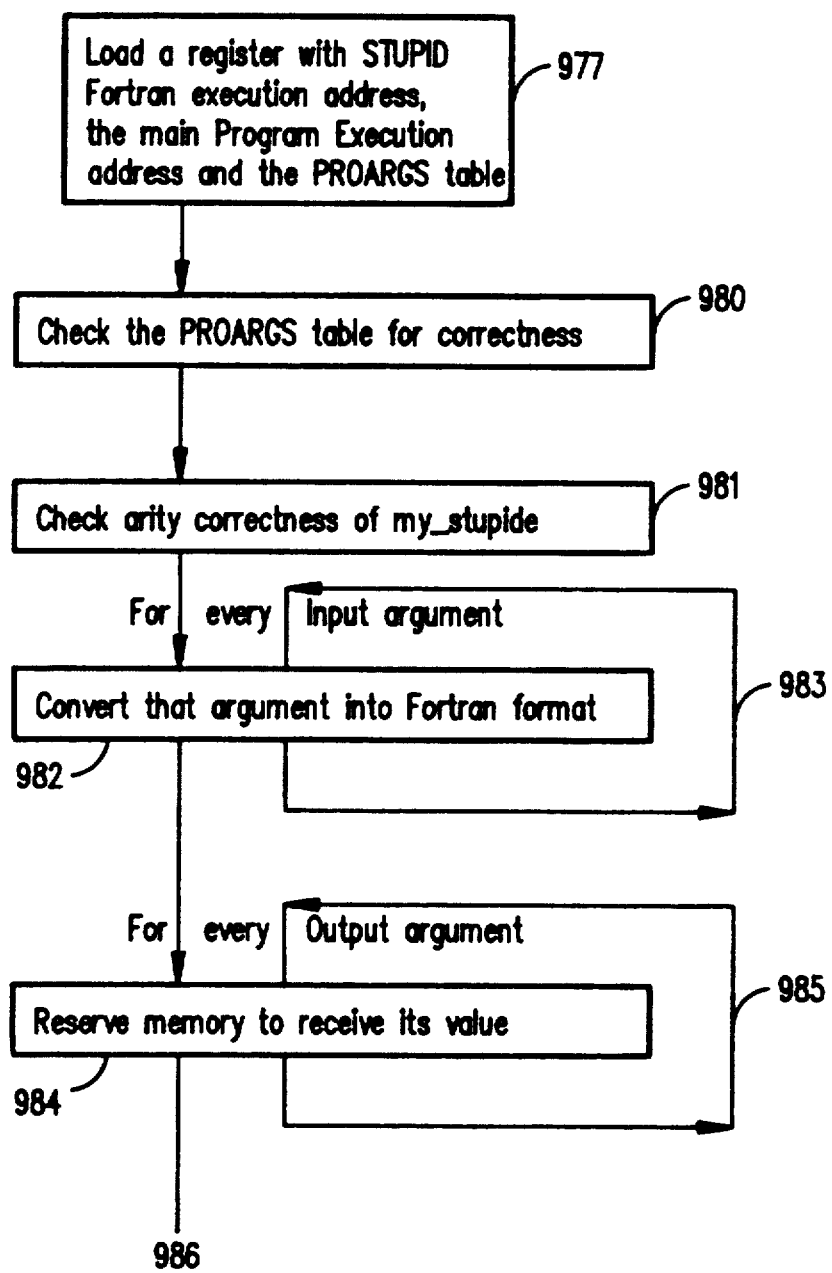
Figure 36C:
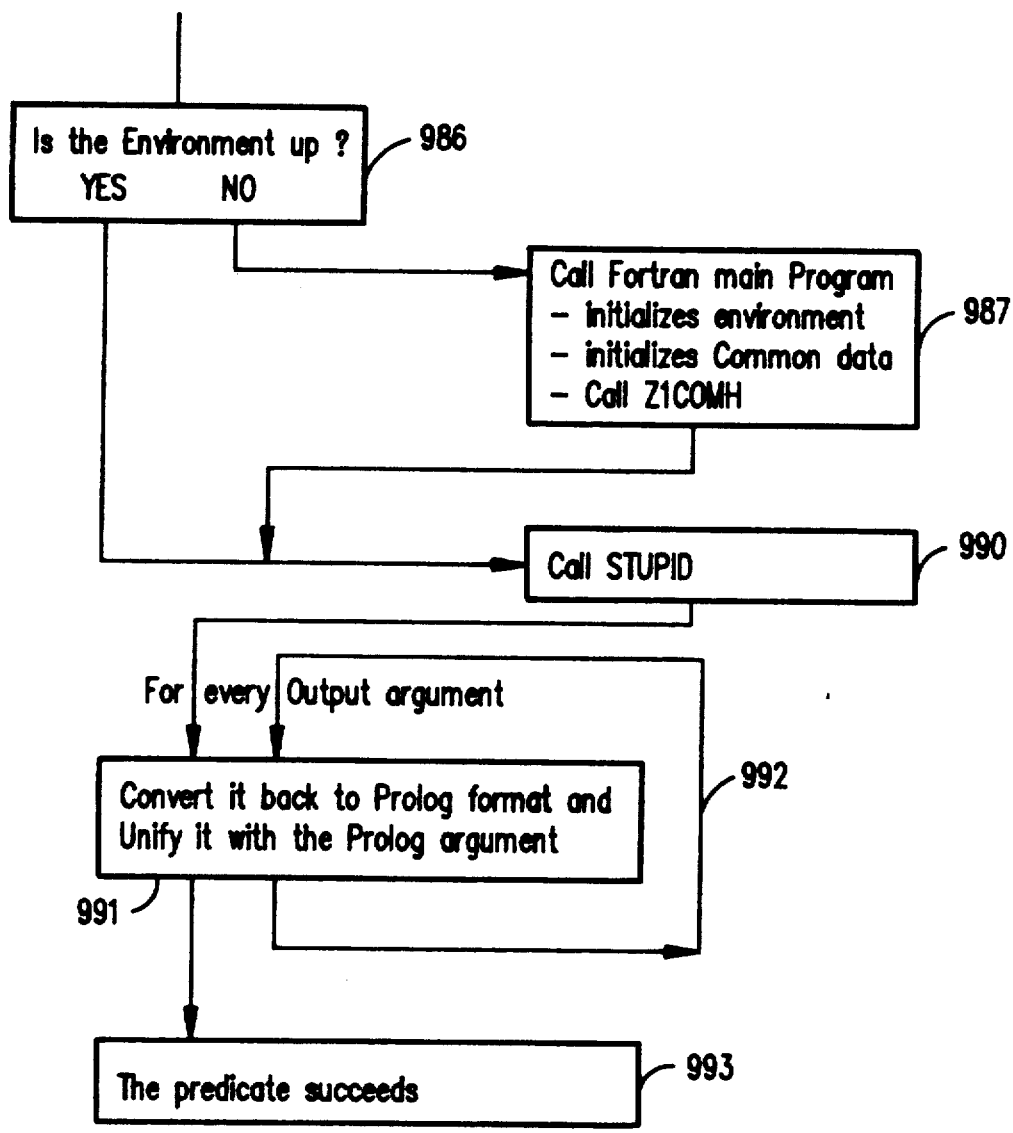

The logic of the communication from Prolog to an external process is shown in FIGS. 36A to 36C. Execution begins at 970 where the predicate my_stupid with one argument shown in the function block becomes defined as an External Non-Connected. Its execution address points to ATTACHF in Prolog's system area. In function block 971 Prolog first encounters a reference to my_stupide(3). Control is passed to ATTACHF for processing the reference to an external process. The file containing the file name where the external process has been built is searched at function block 972 for the particular external process that Prolog desires to execute. The file containing the file name where the external process is user defined. It contains a predicate list created by a plurality of MACRO PRODECE in MYFORT0 ASSEMBLE. Information necessary to execute the external process is stored in the list. This information includes the execution address of the external process.

At function block 973, the external process is brought into memory if it has not previously been loaded. Then, in function block 974 the head of the external process, which was created by MACRO PROINI in MYFORT0 ASSEMBLE (discussed previously), is examined. The header contains a banner and Prolog's version number. The banner is tested for correct identification information for the external process, and the version number is interrogated to assure the current Prolog version is active.

In function block 975 predicate list is searched to obtain the address information for the external process. The predicate list was previously created by one or more MACRO PRODECE in MYFORT0 ASSEMBLE. STUPID is the external fortran name, while STUPIDE is the name used as the third argument of the ext_func. Then, in function block 976, the predicate my_stupide(*) is defined as external connected, its connection address is replaced by linkage code in the predicate list and ATTACHF branches to the connection address. This completes the ATTACHF processing.

At function block 977 the linkage code stores the entry point address of the external process, the Main fortran address and the address of the PROARGS table into a set of predefined registers. Then, control is returned to Prolog at a predefined address ITFFORT2. The conversion of the Prolog arguments to the format the external process expects is managed by the PROARGS table. At function block 980, an integrity check is performed on the PROARGS table. Then, the predicate call is checked to verify argument count.

In function block 982, each argument is passed through the conversion loop 983 to convert arguments from Prolog into the format the external process expects. Then, every output argument is allocated memory in function block 984 and processing loop 985. The information in the PROARGS table manages this processing.

In decision block 986, the status of the external process environment is queried and initiated if it is not already active as shown in function block 987. Once the external environment is active, the specific external process is activated with the converted parameter list it expects. When the external process completes execution, the output arguments are converted back to Prolog format as shown in function block 992. Finally, control is returned to Prolog and the predicate succeeds as shown in function block 993.

From External Process to Prolog

Figure 37A:
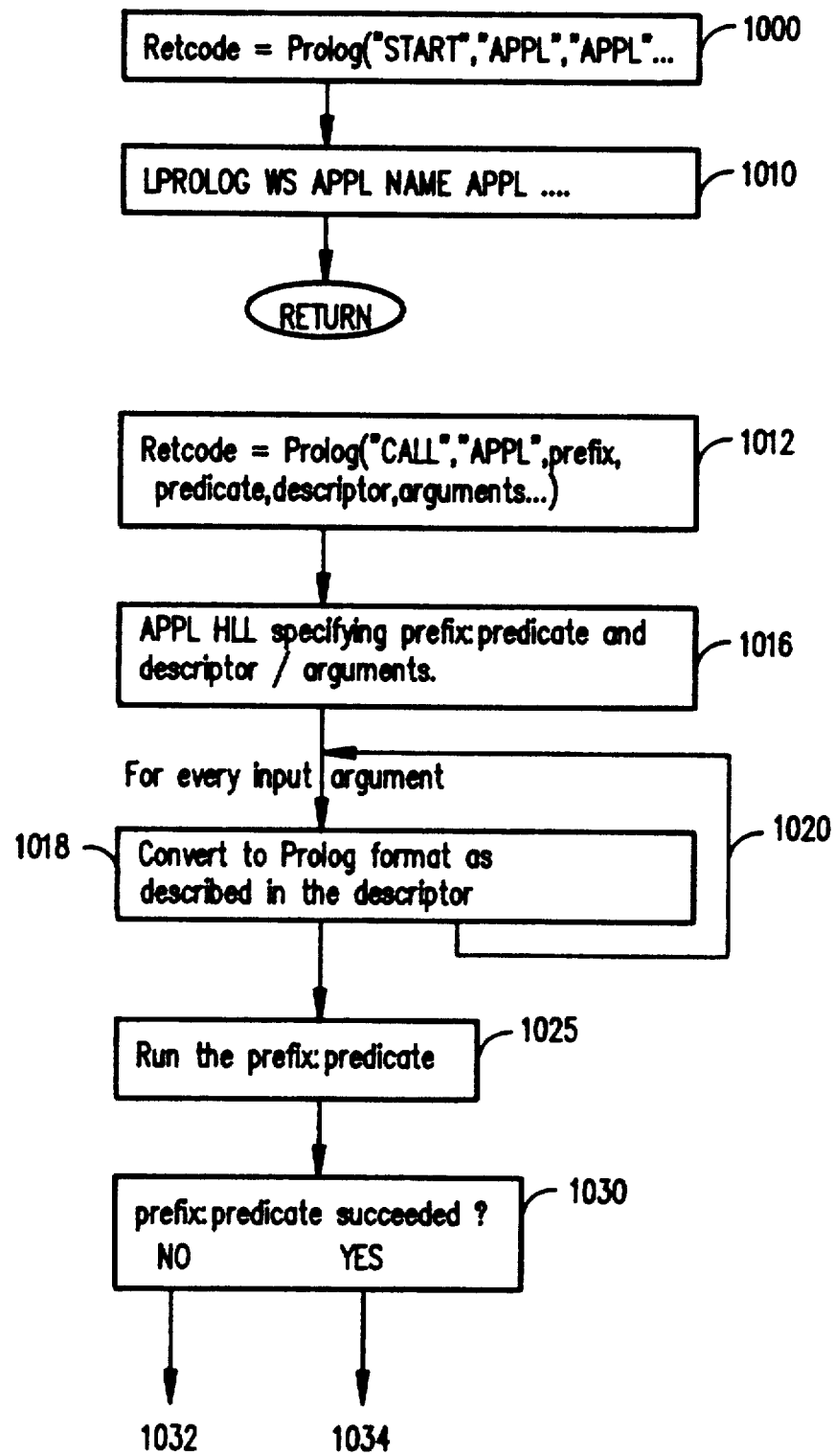
Figure 37B:
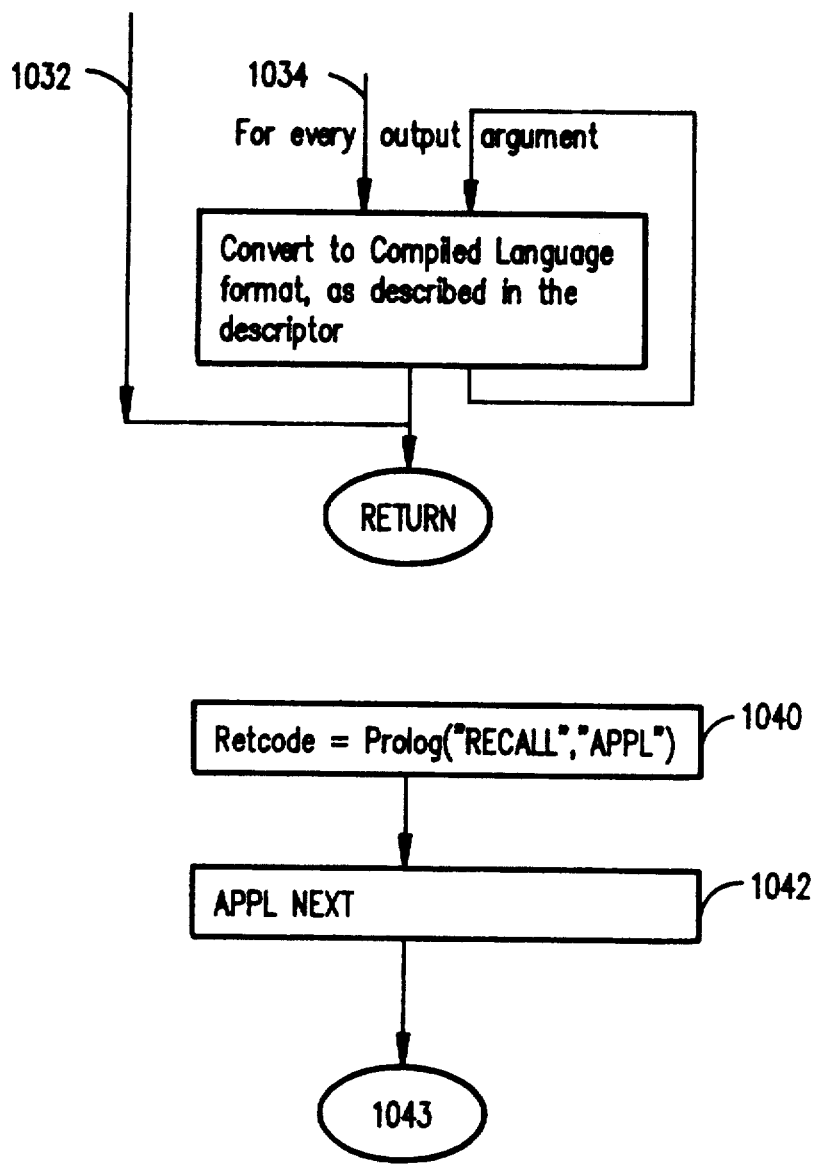

The logic of the communication from Prolog to an external process is shown in FIGS. 37A-37C. Referring to FIG. 37A, execution begins at 1000 where the application wants to start Prolog under the name APPL with a workspace named APPL. The Prolog linkage routine scans the command, recognizes START and extracts the application name and workspace name. The linkage routine starts Prolog by issuing the command shown at function block 1010 to the operating system and returns control to the application.

The application wants to run the predicate 'prefix: predicate' and wants to give it the converted arguments as shown in function block 1012. The conversion is based on the information in the descriptor tables and the format in the PROARGS MACRO. The linkage routine scans commands and recognizes a CALL. The linkage routine formats a system call to Prolog as shown in function block 1016 via a supervisor call employing the command APPL HLL and the arguments prefix, predicate, descriptor, and arguments.

The Prolog system call APPL HLL invokes the conversion processing to convert the arguments from the external process into Prolog's internal format as shown in function block 1018. Function block 1020 loops back to the conversion processing to facilitate conversion of each of the arguments. Once the input arguments are converted, then the predicate is executed as shown in function block 1025. Then, if the predicate succeeds, each output argument is converted back to the external process format as shown in function block 1034 and the loop at 1036 and control is returned to the external process. The conversion back to the external process employs the descriptor table for correct formatting. If the predicate fails, then the Prolog system call terminates at 1032 and returns control to the external process with an error code.

The external process gets the next solution of the previous call via the processing shown in function block 1040. The linkage code issues a Prolog system call as shown in function block 1042. The previous set of linkage information is used to communicate with Prolog. Thus, the Prolog system reruns the previous predicate as shown in function block 1044. Then, if the predicate succeeds as tested in decision block 1046, the output arguments are converted back to the external process format in function block 1052, and the Prolog system returns control to the external process. If the predicate fails, then the Prolog system call terminates and returns an error code.

When the external process wants to complete Prolog processing and cleanup the session, it issues a STOP command as shown in function block 1056. The Prolog linkage routine recognizes the STOP and extracts the session name APPL. The linkage routine terminates the session named APPL by issuing the command shown in function block 1058 to the operating system.

While the invention has been described in terms of a preferred embodiment in a specific system environment, those skilled in the art recognize that the invention can be practiced, with modification, in other and different operating systems within the spirit and scope of the appended claims.

What is claimed is:

1. A method for operating a computer system, having a processor and a memory, to process Prolog programs having predicates comprising the steps of:
    (a) encoding, using the processor of the computer system, a predicate into a set of instructions stored in the memory of the computer system including a simplified instruction consisting of an address of an object and having preceding instructions;
    (b) determining, using the processor of the computer system, an implied operation code for the simplified instruction from the preceding instructions by using a finite state automata having modes for read, write, built and arg to track the preceding instructions and select the implied operation code as unify constant in read and write modes, put constant in built mode and get constant in arg mode; and
    (c) executing, using the processor of the computer system, the implied operation code using the address of the object as a parameter.

2. The method of claim 1 wherein the step of determining an implied operation code further includes using a finite state automata to track the context.

3. The method of claim 1, wherein the step of determining an implied operation code further includes using a finite state automata having modes for read, write, built and arg to track the context.

4. The method of claim 1, wherein the memory includes a plurality of Prolog registers, the step of encoding further including:
    storing at least one unify_stack instruction and an associated argument, the unify_stack instruction having no Prolog register specified; and
    storing at least one pop_structure F instruction, the pop_structure F instruction having no Prolog register specified;
    whereby, the unify_stack and pop_structure F instructions are used in place of unify_variable and get_structure instructions having Prolog registers specified and the number of Prolog register references in the set of instructions stored for the predicate is reduced.

5. The method of claim 4, wherein the memory contains a stack, further comprising the steps of:
    executing the unify_stack instruction by storing its associated argument on a stack; and
    executing the pop_structure F instruction by popping a word from the stack;
    thereby, reducing the number of Prolog register references in the set of instructions executed for the predicate.

6. The method of claim 1, wherein the step of encoding further includes storing the address of the object with a first bit equal to zero and storing all non-simplified instructions with a first bit equal to one, thereby making the simplified instruction distinguishable from non-simplified instructions.

7. A computer system, having a processor and a memory, for processing Prolog programs having predicates comprising:
    (a) means for encoding, using the processor of the computer system, a predicate into a set of instructions stored in the memory of the computer system including a simplified instruction consisting of an address of an object and having preceding instructions;
    (b) means for determining, using the processor of the computer system, an implied operation code for the simplified instruction from the preceding instructions using a finite state automata having modes for read, write, built and arg to track the preceding instructions and select the implied operation code as unify constant in read and write modes, put constant in built mode and get constant in arg mode; and
    (c) means for executing, using the processor of the computer system, the implied operation code using the address of the object as a parameter.

8. The system of claim 7 wherein the means for determining an implied operation code further includes a finite state automata for tracking the context.

9. The system of claim 7, wherein the means for determining an implied operation code further includes a finite state automata having modes for read, write, built and arg to track the context.

10. The system of claim 7, wherein the memory includes a plurality of Prolog registers, the means for encoding further including:
    means for storing at least one unify_stack instruction and an associated argument, the unify_stack instruction having no Prolog register specified; and
    means for storing at least one pop_structure F instruction, the pop_structure F instruction having no Prolog register specified;
    whereby, the unify_stack and pop_structure F instructions are used in place of unify_variable and get_structure instructions having Prolog registers specified and the number of Prolog register references in the set of instructions stored for the predicate is reduced.

11. The system of claim 10, wherein the memory contains a stack, further comprising:
    means for executing the unify_stack instruction by storing its associated argument on a stack; and
    means for executing the pop_structure F instruction by popping a word from the stack;
    whereby, the number of explicit register references in the set of instructions executed for the predicate is reduced.

12. The system of claim 7 wherein the means for encoding further includes means for storing the address of the object with a first bit equal to zero, and means for storing all non-simplified instructions with a first bit equal to one, thereby making the simplified instruction distinguishable from non-simplified instructions.

* * * * *

UNITED STATES PATENT AND TRADEMARK OFFICE
CERTIFICATE OF CORRECTION

PATENT NO. : 5,274,820
DATED : December 28, 1993
INVENTOR(S) : Gillet et al.

It is certified that error appears in the above-indentified patent and that said Letters Patent is hereby corrected as shown below:

Column 11, line 9, delete "an", insert -- a --.

Column 14, line 64, delete "perform", insert -- performs --.

Signed and Sealed this

Sixth Day of June, 1995

Attest:

BRUCE LEHMAN

*Attesting Officer*     *Commissioner of Patents and Trademarks*